United States Patent
Young

(10) Patent No.: US 6,179,741 B1
(45) Date of Patent: Jan. 30, 2001

(54) RANDOM ENGAGEMENT ROLLER CHAIN SPROCKET WITH CUSHION RINGS AND ROOT RELIEF FOR IMPROVED NOISE CHARACTERISTICS

(75) Inventor: James D. Young, Chesaning, MI (US)

(73) Assignee: Cloyes Gear and Products, Inc., Mentor, OH (US)

( * ) Notice: Under 35 U.S.C. 154(b), the term of this patent shall be extended for 0 days.

(21) Appl. No.: 09/383,128

(22) Filed: Aug. 25, 1999

Related U.S. Application Data

(60) Provisional application No. 60/097,931, filed on Aug. 25, 1998.

(51) Int. Cl.[7] .............................. F16H 55/30; F16H 55/12
(52) U.S. Cl. ........................... 474/161; 474/156; 474/160
(58) Field of Search ..................................... 474/161, 160, 474/162, 156, 157, 153

(56) References Cited

U.S. PATENT DOCUMENTS

| | | | |
|---|---|---|---|
| 1,870,801 | * | 8/1932 | Engstrom ......................... 474/161 X |
| 2,199,292 | | 4/1940 | Pierce . |
| 3,057,219 | | 10/1962 | Montgomery . |
| 4,022,072 | | 5/1977 | Chagawa et al. . |
| 4,227,422 | * | 10/1980 | Kawashima et al. ............. 474/161 X |
| 4,261,214 | * | 4/1981 | Watanabe et al. ................ 474/161 X |
| 4,850,942 | | 7/1989 | Dalferth . |
| 5,360,378 | * | 11/1994 | Suzuki et al. ......................... 474/161 |
| 5,980,408 | * | 11/1999 | Shultz ................................. 474/161 |
| 5,993,344 | * | 11/1999 | Young .................................. 474/156 |

FOREIGN PATENT DOCUMENTS

| | | |
|---|---|---|
| 846 889 | 10/1998 | (DE) . |
| 846 890 | 10/1998 | (DE) . |
| 1186486 | 11/1957 | (FR) . |
| 2 325 804 | 9/1975 | (FR) . |
| 57-173649 | 10/1982 | (JP) . |
| 57-190160 | 11/1982 | (JP) . |
| 11-2312 | 6/1999 | (JP) . |
| 386186 | 9/1973 | (SU) . |

* cited by examiner

*Primary Examiner*—David A. Bucci
*Assistant Examiner*—Marcus Charles
(74) *Attorney, Agent, or Firm*—Fay, Sharpe, Fagan, Minnich & McKee, LLP

(57) ABSTRACT

A roller chain sprocket includes a number of sprocket teeth each having an engaging flank and a disengaging flank. An engaging flank of a first tooth of the sprocket cooperates with a disengaging flank of a second tooth to define a tooth space having a root surface extending between the engaging flank and the disengaging flank. The root surface has a first root surface portion defined by a first radius extending from an arc center of the first root surface portion. A cushion ring is mounted to a first face of the sprocket and has a number of alternating compression pads and grooves. A first groove has a first groove portion defined by a second radius extending from an arc center of the first groove portion. The arc center of the first groove portion being positioned at least proximate a radial line extending between a center of the sprocket and the arc center of the first root surface portion. A first compression pad having an inclined outer surface defined by a leading edge that is spaced radially inward relative to a trailing edge. The leading edge is also positioned radially inward from the engaging flank of the first tooth, and the trailing edge is positioned radially inward from a disengaging flank of the first tooth.

20 Claims, 23 Drawing Sheets

ISO

| Z | A | α (MIN) | α (MAX) | γ (MAX) | γ (MIN) |
|---|---|---|---|---|---|
| 18 | 20.000 | 115.00 | 135.00 | 22.500 | 12.500 |
| 19 | 18.947 | 115.26 | 135.26 | 22.895 | 12.895 |
| 20 | 18.000 | 115.50 | 135.50 | 23.250 | 13.250 |
| 21 | 17.143 | 115.71 | 135.71 | 23.571 | 13.571 |
| 22 | 16.364 | 115.91 | 135.91 | 23.864 | 13.864 |
| 23 | 15.652 | 116.09 | 136.09 | 24.130 | 14.130 |
| 24 | 15.000 | 116.25 | 136.25 | 24.375 | 14.375 |
| 25 | 14.400 | 116.40 | 136.40 | 24.600 | 14.600 |
| 26 | 13.846 | 116.54 | 136.54 | 24.808 | 14.808 |
| 27 | 13.333 | 116.67 | 136.67 | 25.000 | 15.000 |
| 28 | 12.857 | 116.79 | 136.79 | 25.179 | 15.179 |
| 29 | 12.414 | 116.90 | 136.90 | 25.345 | 15.345 |
| 30 | 12.000 | 117.00 | 137.00 | 25.500 | 15.500 |

Fig. 4
PRIOR ART

ASYMMETRICAL

| Z | A | 1 β (MAX) | 1 γ (MIN) | 2 β (MAX) | 2 γ (MIN) | 3 β (MAX) | 3 γ (MIN) |
|---|---|---|---|---|---|---|---|
| 18 | 20.000 | 73.75 | 6.25 | 76.92 | 3.08 | 80.00 | 0 |
| 19 | 18.947 | 74.08 | 6.45 | 77.29 | 3.24 | 80.53 | 0 |
| 20 | 18.000 | 74.38 | 6.63 | 77.62 | 3.38 | 81.00 | 0 |
| 21 | 17.143 | 74.64 | 6.79 | 77.92 | 3.51 | 81.43 | 0 |
| 22 | 16.364 | 74.89 | 6.93 | 78.19 | 3.63 | 81.82 | 0 |
| 23 | 15.652 | 75.11 | 7.07 | 78.43 | 3.74 | 82.17 | 0 |
| 24 | 15.000 | 75.31 | 7.19 | 78.66 | 3.84 | 82.50 | 0 |
| 25 | 14.400 | 75.50 | 7.30 | 78.87 | 3.93 | 82.80 | 0 |
| 26 | 13.846 | 75.67 | 7.40 | 79.06 | 4.02 | 83.08 | 0 |
| 27 | 13.333 | 75.83 | 7.50 | 79.24 | 4.09 | 83.33 | 0 |
| 28 | 12.857 | 75.98 | 7.59 | 79.41 | 4.17 | 83.57 | 0 |
| 29 | 12.414 | 76.12 | 7.67 | 79.56 | 4.23 | 83.79 | 0 |
| 30 | 12.000 | 76.25 | 7.75 | 79.70 | 4.30 | 84.00 | 0 |

Fig. 5

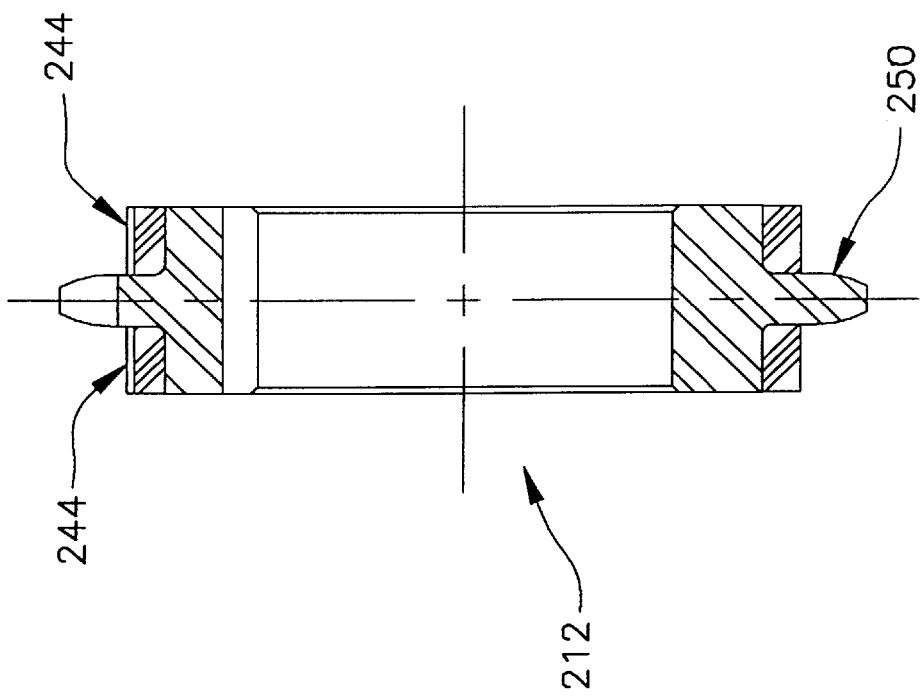

RANDOM ENGAGEMENT ROLLER CHAIN SPROCKET WITH CUSHION RINGS AND ROOT RELIEF FOR IMPROVED NOISE CHARACTERISTICS

CROSS REFERENCE TO RELATED APPLICATIONS

This application claims the benefit of U.S. Provisional Patent Application Serial No. 60/097,931, filed Aug. 25, 1998. This application relates to copending application Ser. Nos. 09/277,058 entitled RANDOM ENGAGEMENT ROLLER CHAIN SPROCKET WITH STAGED MESHING AND ROOT RELIEF TO PROVIDE IMPROVED NOISE CHARACTERISTICS filed in the name of Young now U.S. Pat. No. 5,976,045 and 08/900,661 entitled RANDOM ENGAGEMENT ROLLER CHAIN SPROCKET WITH IMPROVED NOISE CHARACTERISTICS filed Jul. 25, 1997 in the name of Young now U.S. Pat. No. 5,976,045, both of which are hereby incorporated by reference for all that they teach.

BACKGROUND OF THE INVENTION

The present invention relates to the automotive timing chain art. It finds particular application in conjunction with a roller chain sprocket for use in automotive camshaft drive applications and will be described with particular reference thereto. However, the present invention may also find application in conjunction with other types of chain drive systems and applications where reducing the noise levels associated with chain drives is desired.

Roller chain sprockets for use in camshaft drives of automotive engines are typically manufactured according to one or more international standards such as DIN, JIS, ISO, etc. The ISO-606:1994(E) (International Organization for Standardization) standard specifies requirements for short-pitch precision roller chains and associated chain wheels or sprockets.

FIG. 1 illustrates a symmetrical tooth space form for an ISO-606 compliant sprocket. The tooth space has a continuous fillet or root radius $R_i$ extending from one tooth flank (i.e., side) to the adjacent tooth flank as defined by the roller seating angle $\alpha$. The flank radius $R_f$ is tangent to the roller seating radius $R_i$ at the tangency point TP. A chain with a link pitch P has rollers of diameter $D_1$ in contact with the tooth spaces. The ISO sprocket has a chordal pitch also of length P, a root diameter $D_2$, and Z number of teeth. The pitch circle diameter PD, tip or outside diameter OD, and tooth angle A (equal to 360°/Z) further define the ISO-606 compliant sprocket. The maximum and minimum roller seating angle $\alpha$ is defined as:

$\alpha_{max} = (140° - 90°)/Z$ and $\alpha_{min} = (120° - 90°)/Z$

With reference to FIG. 2, an exemplary ISO-606 compliant roller chain drive system 10 rotates in a clockwise direction as shown by arrow 11. The chain drive system 10 includes a drive sprocket 12, a driven sprocket 14 and a roller chain 16 having a number of rollers 18. The sprockets 12, 14, and chain 16 each generally comply with the ISO-606 standard.

The roller chain 16 engages and wraps about sprockets 12 and 14 and has two spans extending between the sprockets, slack strand 20 and taut strand 22. The roller chain 16 is under tension as shown by arrows 24. A central portion of the taut strand 22 may be guided between the driven sprocket 14 and the drive sprocket 12 with a conventional chain guide (not shown). A first roller 28 is shown at the onset of meshing at a 12 o'clock position on the drive sprocket 12. A second roller 30 is adjacent to the first roller 28 and is the next roller to mesh with the drive sprocket 12.

Chain drive systems have several components of undesirable noise. A major source of roller chain drive noise is the sound generated as a roller leaves the span and collides with the sprocket during meshing. The resultant impact noise is repeated with a frequency generally equal to that of the frequency of the chain meshing with the sprocket. The loudness of the impact noise is a function of the impact energy ($E_A$) occurring during the meshing process. The impact energy ($E_A$) is related to engine speed, chain mass, and the impact velocity between the chain and the sprocket at the onset of meshing. The impact velocity is affected by the chain-sprocket engagement geometry, of which an engaging flank pressure angle $\gamma$ (FIG. 3) is a factor, where:

$$E_A = \frac{wP}{2000} V_A^2;$$

$$V_A = \frac{n n P}{30000} \sin\left(\frac{360}{Z} + \gamma\right);$$

$$\gamma = \frac{180 - A - \alpha}{2}; \quad \text{and}$$

$E_A$ = Impact Energy [N · m]
$V_A$ = Roller Impact Velocity [m/s]
$\gamma$ = Engaging Flank Pressure Angle
n = Engine Speed [RPM]
w = Chain Mass [Kg/m]
Z = Number of Sprocket Teeth
A = Tooth Angle (360°/Z)
$\alpha$ = Roller Seating Angle
P = Chain Pitch (Chordal Pitch)

The impact energy ($E_A$) equation presumes the chain drive kinematics will conform generally to a quasi-static analytical model and that the roller-sprocket driving contact will occur at a tangent point TP (FIG. 3) of the flank and root radii as the sprocket collects a roller from the span.

As shown in FIG. 3, the pressure angle $\gamma$ is defined as the angle between a line A extending from the center of the engaging roller 28, when it is contacting the engaging tooth flank at the tangency point TP, through the center of the flank radius $R_f$, and a line B connecting the centers of the fully seated roller 28, when it is seated on root diameter $D_2$, and the center of the next meshing roller 30, as if it were also seated on root diameter $D_2$ in its engaging tooth space. The roller seating angles $\alpha$ and pressure angles $\gamma$ listed in FIG. 4 are calculated from the equations defined above. It should be appreciated that $\gamma$ is a minimum when $\alpha$ is a maximum. Thus, the exemplary 23-tooth, ISO-606 compliant, drive sprocket 12 shown in FIGS. 2 and 3 will have a pressure angle $\gamma$ in the range of 14.13° to 24.13° as listed in the table of FIG. 4.

FIG. 3 also shows the engagement path (phantom rollers) and the driving contact position of roller 28 (solid) as the drive sprocket 12 rotates in the direction of arrow 11. FIG. 3 depicts the theoretical case with chain roller 28 seated on root diameter $D_2$ of a maximum material sprocket with both chain pitch and sprocket chordal pitch equal to theoretical pitch P. For this theoretical case, the noise occurring at the onset of roller engagement has a radial component $F_R$ as a result of roller 28 colliding with the root surface $R_i$ and a tangential component $F_T$ generated as the same roller 28 collides with the engaging tooth flank at point TP as the roller moves into driving contact. It is believed that the radial impact occurs first, with the tangential impact following nearly simultaneously. Roller impact velocity $V_A$ is shown to act through, and is substantially normal to, engaging flank tangent point TP with roller 28 in driving contact at point TP.

The impact energy ($E_A$) equation accounts only for a tangential roller impact during meshing. The actual roller engagement, presumed to have a tangential and radial impact (occurring in any order), would therefore seem to be at variance with the impact energy ($E_A$) equation. The application of this quasi-static model, which is beneficially used as a directional tool, permits an analysis of those features that may be modified to reduce the impact energy occurring during the tangential roller-sprocket collision at the onset of meshing. The radial collision during meshing, and its effect on noise levels, can be evaluated apart from the impact energy ($E_A$) equation.

Under actual conditions as a result of feature dimensional tolerances, there will normally be a pitch mismatch between the chain and sprocket, with increased mismatch as the components wear in use. This pitch mismatch serves to move the point of meshing impact, with the radial collision still occurring at the root surface $R_i$ but not necessarily at $D_2$. The tangential collision will normally be in the proximity of point TP, but this contact could take place high up on the engaging side of root radius $R_i$ or even radially outward from point TP on the engaging flank radius $R_f$ as a function of the actual chain-sprocket pitch mismatch.

Reducing the engaging flank pressure angle γ reduces the meshing noise levels associated with roller chain drives, as predicted by the impact energy ($E_A$) equation set forth above. It is feasible but not recommended to reduce the pressure angle γ while maintaining a symmetrical tooth profile, which could be accomplished by simply increasing the roller seating angle α, effectively decreasing the pressure angle for both flanks. This profile as described requires that a worn chain would, as the roller travels around a sprocket wrap (discussed below), interface with a much steeper incline and the rollers would necessarily ride higher up on the coast flank prior to leaving the wrap.

Another source of chain drive noise is the broadband mechanical noise generated in part by shaft torsional vibrations and slight dimensional inaccuracies between the chain and the sprockets. Contributing to a greater extent to the broadband mechanical noise level is the intermittent or vibrating contact that occurs between the unloaded rollers and the sprocket teeth as the rollers travel around the sprocket wrap. In particular, ordinary chain drive system wear comprises sprocket tooth face wear and chain wear. The chain wear is caused by bearing wear in the chain joints and can be characterized as pitch elongation. It is believed that a worn chain meshing with an ISO standard sprocket will have only one roller in driving contact and loaded at a maximum loading condition.

With reference again to FIG. 2, driving contact at maximum loading occurs as a roller enters a drive sprocket wrap 32 at engagement. Engaging roller 28 is shown in driving contact and loaded at a maximum loading condition. The loading on roller 28 is primarily meshing impact loading and the chain tension loading. The next several rollers in the wrap 32 forward of roller 28 share in the chain tension loading, but at a progressively decreasing rate. The loading of roller 28 (and to a lesser extent for the next several rollers in the wrap) serves to maintain the roller in solid or hard contact with the sprocket root surface 34.

A roller 36 is the last roller in the drive sprocket wrap 32 prior to entering the slack strand 20. Roller 36 is also in hard contact with drive sprocket 12, but at some point higher up (e.g., radially outwardly) on the root surface 34. With the exception of rollers 28 and 36, and the several rollers forward of roller 28 that share the chain tension loading, the remaining rollers in the drive sprocket wrap 32 are not in hard contact with the sprocket root surface 34, and are therefore free to vibrate against the sprocket root surfaces as they travel around the wrap, thereby contributing to the generation of unwanted broadband mechanical noise.

A roller 38 is the last roller in a sprocket wrap 40 of the driven sprocket 14 before entering the taut strand 22. The roller 38 is in driving contact with the sprocket 14. As with the roller 36 in the drive sprocket wrap 32, a roller 42 in the sprocket wrap 40 is in hard contact with a root radius 44 of driven sprocket 14, but generally not at the root diameter.

It is known that providing pitch line clearance (PLC) between sprocket teeth promotes hard contact between the chain rollers and sprocket in the sprocket wrap, even as the roller chain wears. The amount of pitch line clearance added to the tooth space defines a length of a short arc that is centered in the tooth space and forms a segment of the root diameter $D_2$. The root fillet radius $R_i$ is tangent to the flank radius $R_F$ and the root diameter arc segment. The tooth profile is still symmetrical, but $R_i$ is no longer a continuous fillet radius from one flank radius to the adjacent flank radius. This has the effect of reducing the broadband mechanical noise component of a chain drive system. However, adding pitch line clearance between sprocket teeth does not reduce chain drive noise caused by the roller-sprocket collision at impact.

Another attempt to reduce the noise levels associated with roller chain meshing is described in U.S. Pat. No. 5,397,278 which discloses the undercutting or relieving of the root surfaces so as to eliminate the radial roller-root surface contact at the onset of meshing. However, the invention disclosed in the '278 patent does not modulate the meshing impact frequency. That is, all of the tooth profiles are substantially identical. Therefore, the flank impacts occur at the meshing frequency. An additional disadvantage of the sprocket disclosed in the '278 patent is that the rollers contact both engaging and disengaging flanks at full mesh. Thus, a roller can become wedged within the tooth space when no clearance is provided between the roller and a disengaging flank with the roller seated in full mesh.

A further attempt to reduce the noise levels associated with roller chain meshing is to incorporate one or more elastomeric cushion rings that serve to buffer or soften the engaging impact of a roller as it leaves the span and collides with a sprocket during the meshing process. With reference to FIG. 6, a drive sprocket 112, associated with a conventional roller chain drive system 110, incorporates symmetrical, ISO-606 compliant tooth space profiles. The drive sprocket 112 is substantially identical to the drive sprocket 12 (FIG. 2) except that the drive sprocket 112 includes two circular cushion rings 144, one secured on each hub of the sprocket 112. Each cushion ring 144 has a continuous or otherwise uniform outer surface that is defined by a radius R. As is known in the art, the cushion rings 144 serve to buffer or soften the engaging impact of a roller as it leaves the span and collides with a sprocket during the meshing process.

More particularly, as shown in FIGS. 6a and 6b, a roller 128, a bushing (129), and an associated pin (131), are carried by two sets of overlapping link plates 146L, 146R and 148L, 148R. As the drive sprocket 112 rotates in the direction of arrow 11, the link plates 146 impact, and then compress or otherwise deform, the outer surfaces of both cushion rings 144, prior to roller 128 colliding with the associated sprocket tooth followed consecutively by the link plates 148. As a result, the impact velocity of the roller 128 is reduced prior to meshing with the sprocket, thereby reducing meshing impact noise. The maximum amount of cushion ring compression 149 occurs close to, or at, the midpoint P/2 between adjacent rollers having a chain pitch P. FIG. 6b shows the rubber compression to alternate in consecutive pitches between link plates 146 and link plates 148. A typical problem with cushion rings is one of durability. That is, wear and compression set of the elastomeric material of the cushion rings can be expected in the area of maximum ring compression after repeated link impacts. In addition, the cushion ring may eventually fatigue as a result of the repeated compression cycles during the meshing process.

Accordingly, it is considered desirable to develop a new and improved roller chain drive system and sprocket which meets the above-stated needs and overcomes the foregoing disadvantages and others while providing better and more advantageous results.

SUMMARY OF THE INVENTION

In accordance with one aspect of the present invention, a sprocket is disclosed. The sprocket includes a central body portion having a plurality of sprocket teeth spaced along a circumference of the central body portion. The plurality of sprocket teeth each have an engaging flank and a disengaging flank. An engaging flank of a first tooth of the plurality of sprocket teeth cooperates with a disengaging flank of a second tooth of the plurality of sprocket teeth to define a tooth space having a root surface extending between the engaging flank of the first tooth and the disengaging flank of the second tooth. The root surface has a first root surface portion defined by a first radius extending from an arc center of the first root surface portion. A cushion ring is mounted to a first face of the central body section and has a plurality of compression pads and a plurality of grooves alternately positioned around a circumference of the cushion ring. A first groove of the plurality of grooves has a first groove portion defined by a second radius extending from an arc center of the first groove portion. The arc center of the first groove portion is positioned at least proximate a radial line extending between a center of the central body portion and the arc center of the first root surface portion. A first compression pad has an inclined outer surface defined by a leading edge that is spaced radially inward relative to a trailing edge. The leading edge is positioned radially inward from the engaging flank of the first tooth, and the trailing edge is positioned radially inward from a disengaging flank of the first tooth.

One advantage of the present invention is the provision of a sprocket that includes at least one cushion ring designed to increase the fatigue life of the elastomeric material that forms the cushion ring.

Another advantage of the present invention is the provision of a sprocket having two sets of sprocket teeth incorporating different tooth profiles, and at least one cushion ring that cooperates with the tooth profiles to reduce chain drive system noise levels below a noise level that either the tooth profiles or the cushion ring alone would produce.

Another advantage of the present invention is the provision of a sprocket having two different sets of asymmetrical sprocket teeth each incorporating root relief.

Another advantage of the present invention is the provision of a sprocket that incorporates a flank flat on an engaging tooth surface to phase the frequency of initial roller-to-engaging flank contacts of a first tooth profile relative to initial roller-to-engaging flank contacts of a second tooth profile thereby altering the rhythm of the initial roller-to-first engaging flank and the roller-to-second engaging flank contacts.

Yet another advantage of the present invention is the provision of a sprocket that minimizes impact noise generated by a roller-sprocket collision during meshing and/or broadband mechanical noise generated by unloaded rollers in a sprocket wrap.

A still further advantage of the present invention is the provision of a sprocket that provides a "staged" roller impact where a tangential roller-sprocket impact occurs first followed by a radial roller-sprocket impact at full mesh.

Yet a further advantage of the present invention is the provision of a sprocket that spreads a roller engagement over a significant time interval to provide for a more gradual load transfer thereby minimizing a roller-sprocket impact and the inherent noise generated therefrom.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 4 is a table listing roller seating angles a and pressure angles γ for a number of different ISO-606 complaint sprocket sizes;

FIG. 5 is a table listing the maximum Beta (β) angles and the corresponding pressure angles (γ) for three different asymmetrical tooth space profiles (1–3) of varying sprocket sizes of the present invention;

FIG. 6b is a cross section view through the roller chain link plate taken along the line 6b—6b in FIG. 6a;

FIG. 8a is a cross section view through the sprocket taken along the line 8a—8a of FIG. 8;

DETAILED DESCRIPTION OF THE PREFERRED EMBODIMENTS

Figure 7:
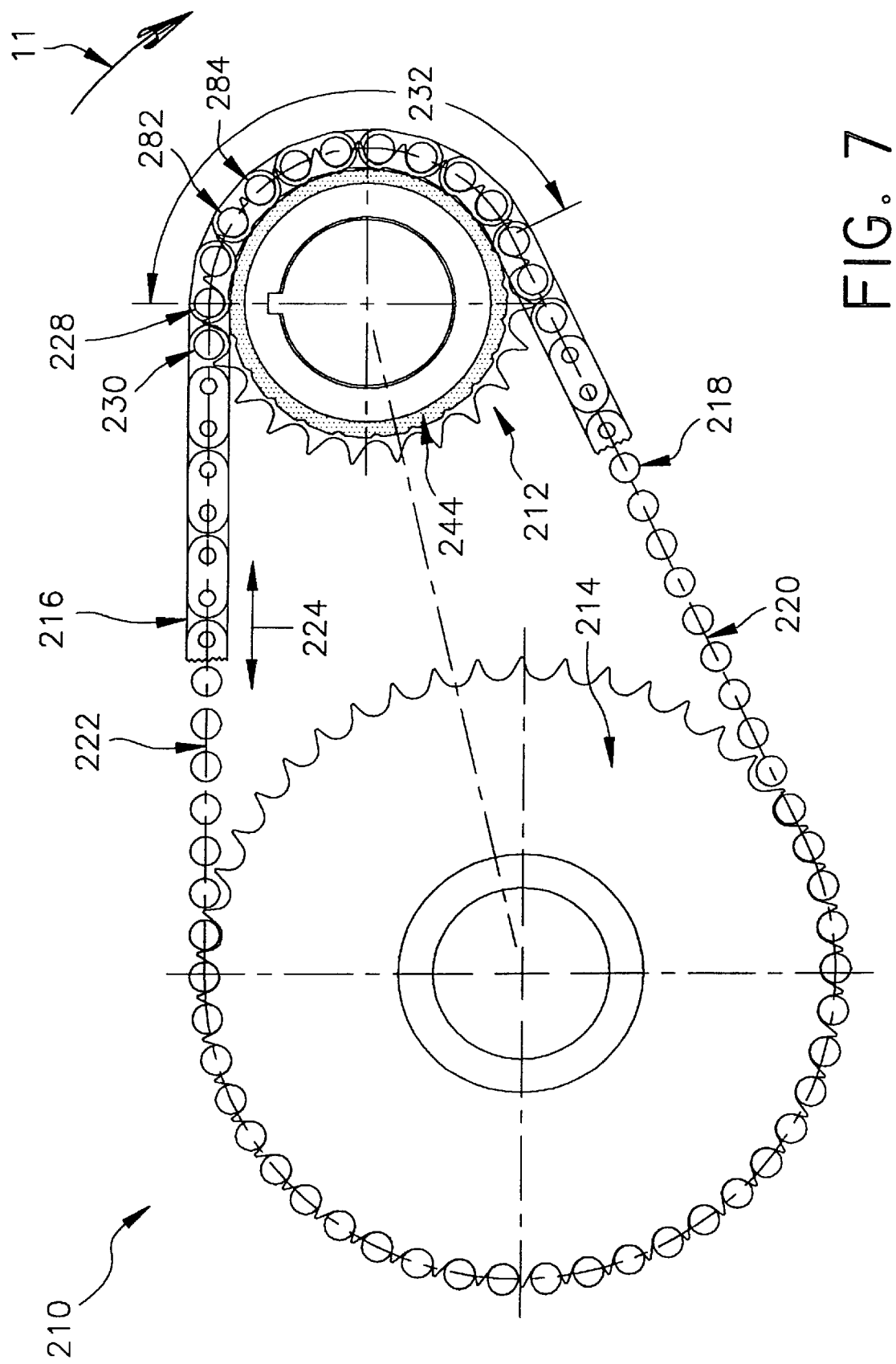
FIG. 7 illustrates an exemplary roller chain drive system that incorporates the features of the present invention therein.

With reference now to FIG. 7, a roller chain drive system 210 that incorporates the features of the present invention therein. The roller chain drive system 210 includes a random-engagement drive sprocket 212, a driven sprocket 214, and a roller chain 216 having a number of rollers 218 which engage and wrap about sprockets 212, 214. The roller chain rotates in a clockwise direction as shown by arrow 11.

The roller chain 216 has two spans extending between the sprockets, slack strand 220 and taut strand 222. The roller chain 216 is under tension as shown by arrows 224. A central portion of the taut strand 222 may be guided between the driven sprocket 214 and the drive sprocket 212 with a chain guide (not shown). A first roller 228 is shown fully seated at a 12 o'clock position on the drive sprocket 212. A second roller 230 is adjacent to the first roller 228 and is the next roller to mesh with the drive sprocket 212.

To facilitate the description of an asymmetrical tooth profiles of the present invention, reference will be made only to the drive sprocket 212. However, the asymmetrical tooth profiles of the present invention are equally applicable to the driven sprocket 214, as well as to other types of sprockets such as idler sprockets and sprockets associated with counter rotating balance shafts, etc.

Figure 8:
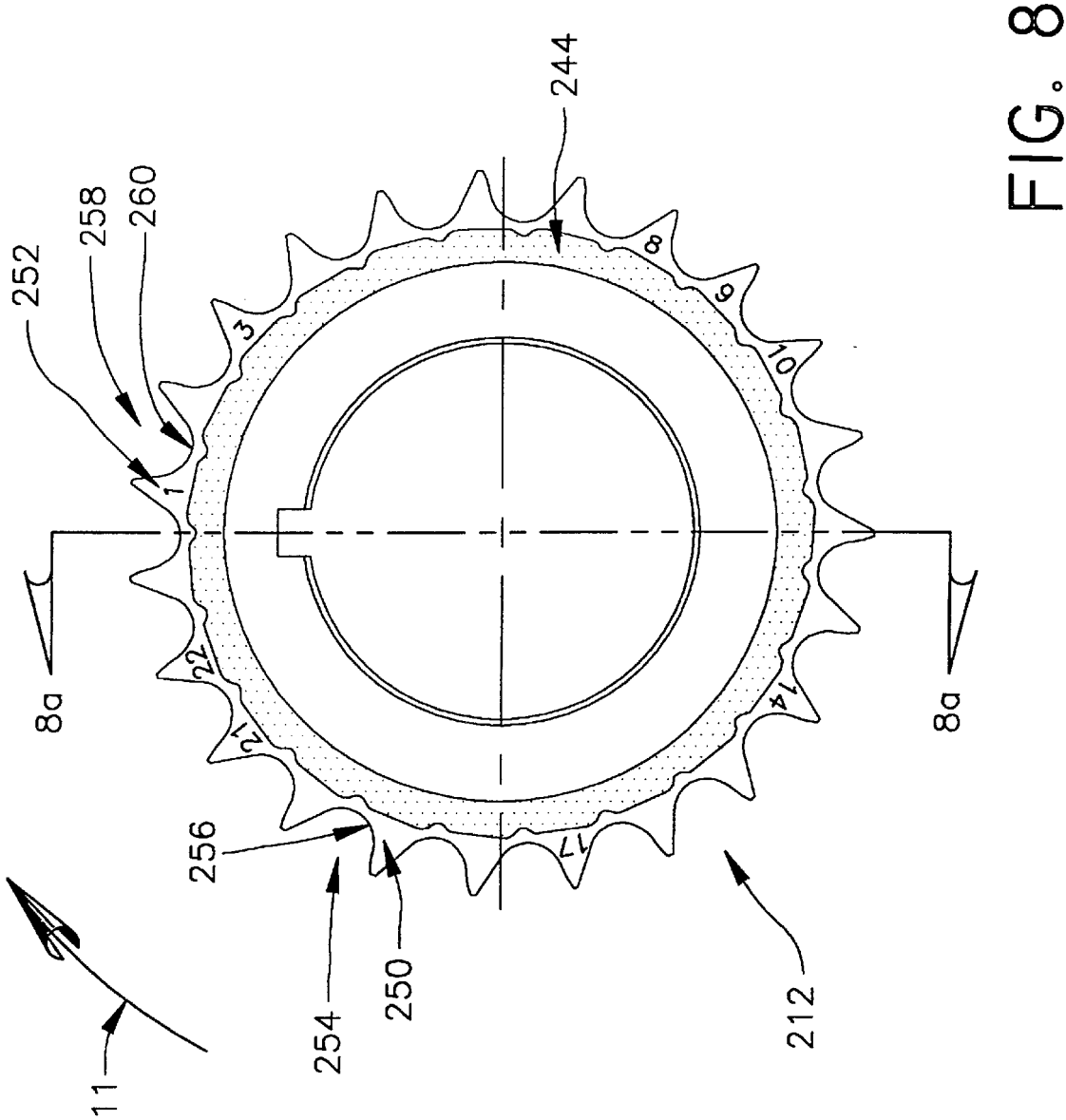
FIG. 8 illustrates a random-engagement roller chain drive sprocket of the drive system of FIG. 7.

With continuing reference to FIG. 7 and particular reference to FIGS. 8 and 8a, the random-engagement roller chain drive sprocket 212 is illustrated as a 23-tooth sprocket. However, the sprocket 212 may have more or less teeth, as desired. The sprocket 212 includes a first group of sprocket teeth 250 (not numbered) and a second group of sprocket teeth 252 (numbered as sprocket teeth 1, 3, 8, 9, 10, 14, 17, 21, and 22). In the embodiment being described, there are fourteen sprocket teeth 250 and nine sprocket teeth 252 arbitrarily positioned around the sprocket 212. However, it should be appreciated that the number and position of each type of sprocket tooth can vary without departing from the scope of the invention. The sprocket 212 includes two elastomeric cushion or damper rings 244 secured or otherwise attached in a conventional manner to the respective faces of the sprocket. In the preferred embodiment the cushion rings are formed from a conventional elastomeric material such as a Nitrile rubber compound.

The two sets of sprocket teeth 250, 252 are arranged in a random pattern in order to modify the meshing impact frequency by altering the point and rhythm of initial roller-to-sprocket contact. However, the two sets of sprocket teeth 250, 252 could be arranged in many different random patterns. Further, it is also contemplated that the two sets of sprocket teeth 250, 252 could be arranged in many regular patterns that would work equally as well. In all cases, the arrangement of two sets of sprocket teeth on a sprocket provides a means for breaking up the mesh frequency impact noise normally associated with and induced by a full complement of substantially identically shaped sprocket teeth. The mesh frequency noise reduction is achieved, in part, by altering the point and rhythm of initial roller-to-sprocket contact.

The sprocket teeth 250 each include an engaging side or flank profile that cooperates with a disengaging side or flank profile of an adjacent tooth (in a clockwise-manner) to form a first asymmetrical tooth space 254 having a root surface 256. The numbered sprocket teeth 252 each include an engaging side or flank profile that cooperates with a disengaging side or flank profile of an adjacent tooth (in a clockwise-manner) to form a second asymmetrical tooth space 258 having a root surface 260. As described further below, the first and second groups of sprocket teeth 250, 252 cooperate with the cushion rings 244 to reduce chain drive system noise levels below a noise level which either tooth profile used alone would produce.

Figure 9:
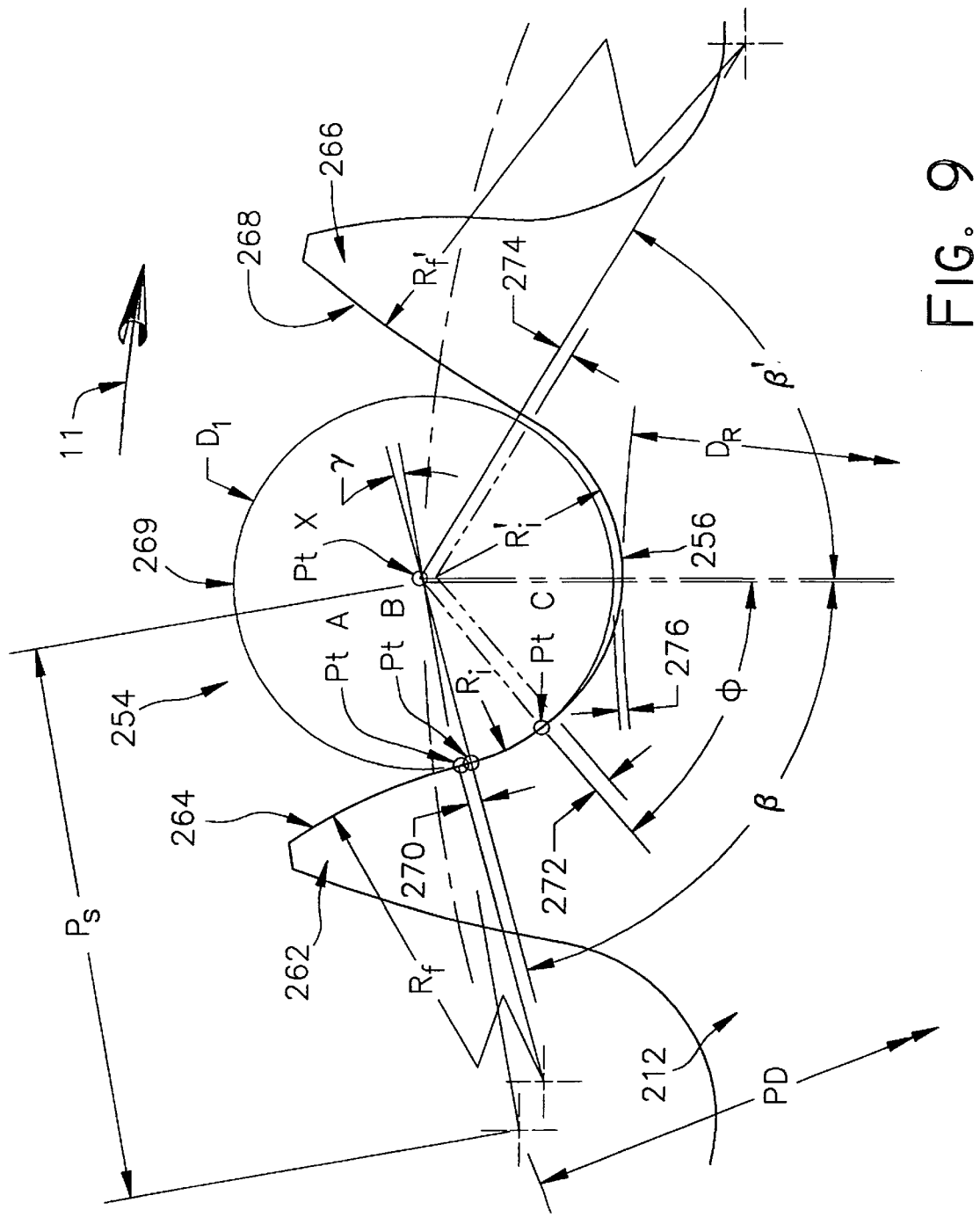
FIG. 9 illustrates a first asymmetrical tooth space profile for the sprocket of FIG. 8.
Figure 9A:
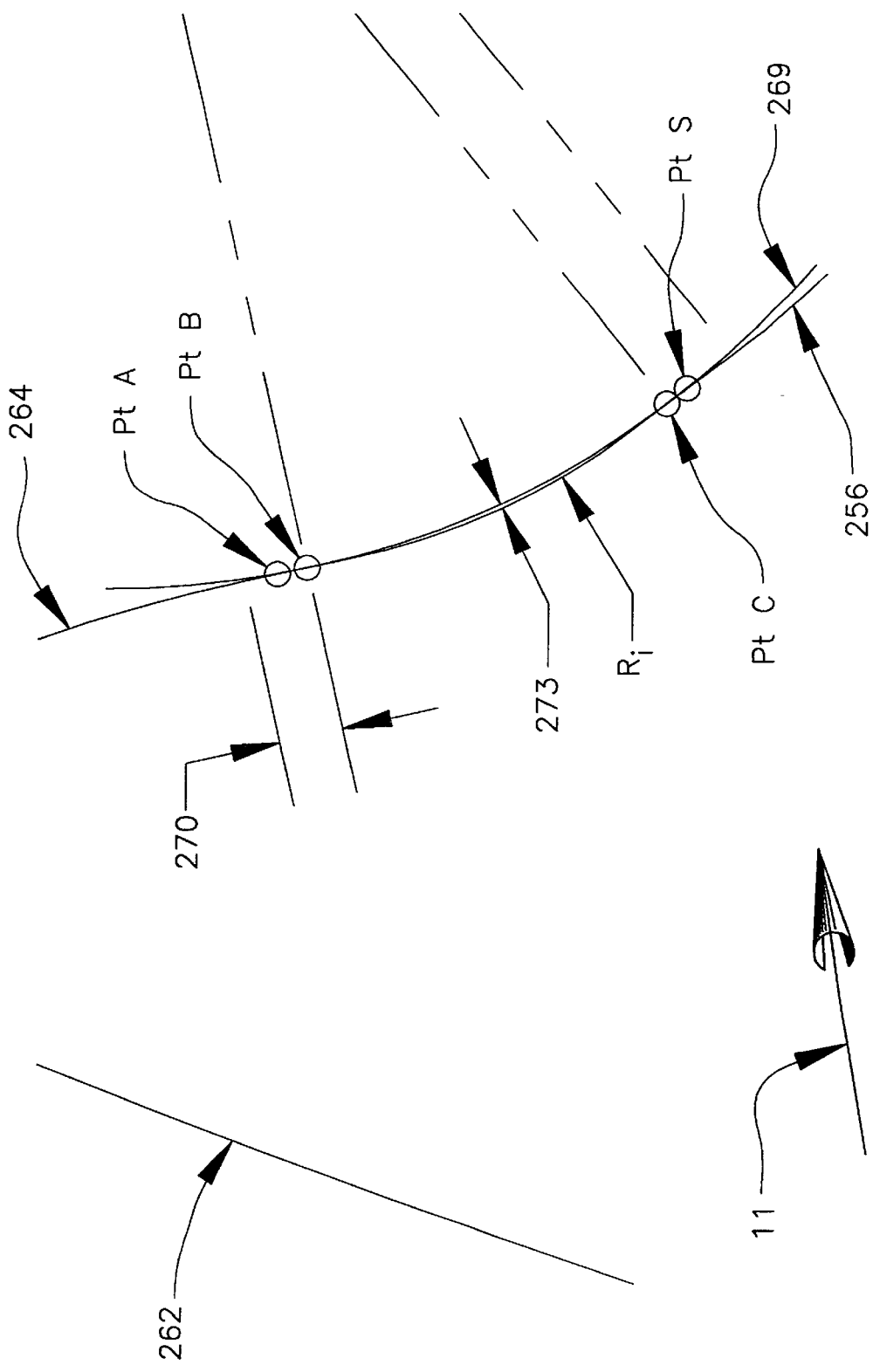
FIG. 9a is an enlarged partial view of an engaging flank of the first asymmetrical tooth space profile of FIG. 9 with a roller fully seated in two-point contact.
Figure 9B:
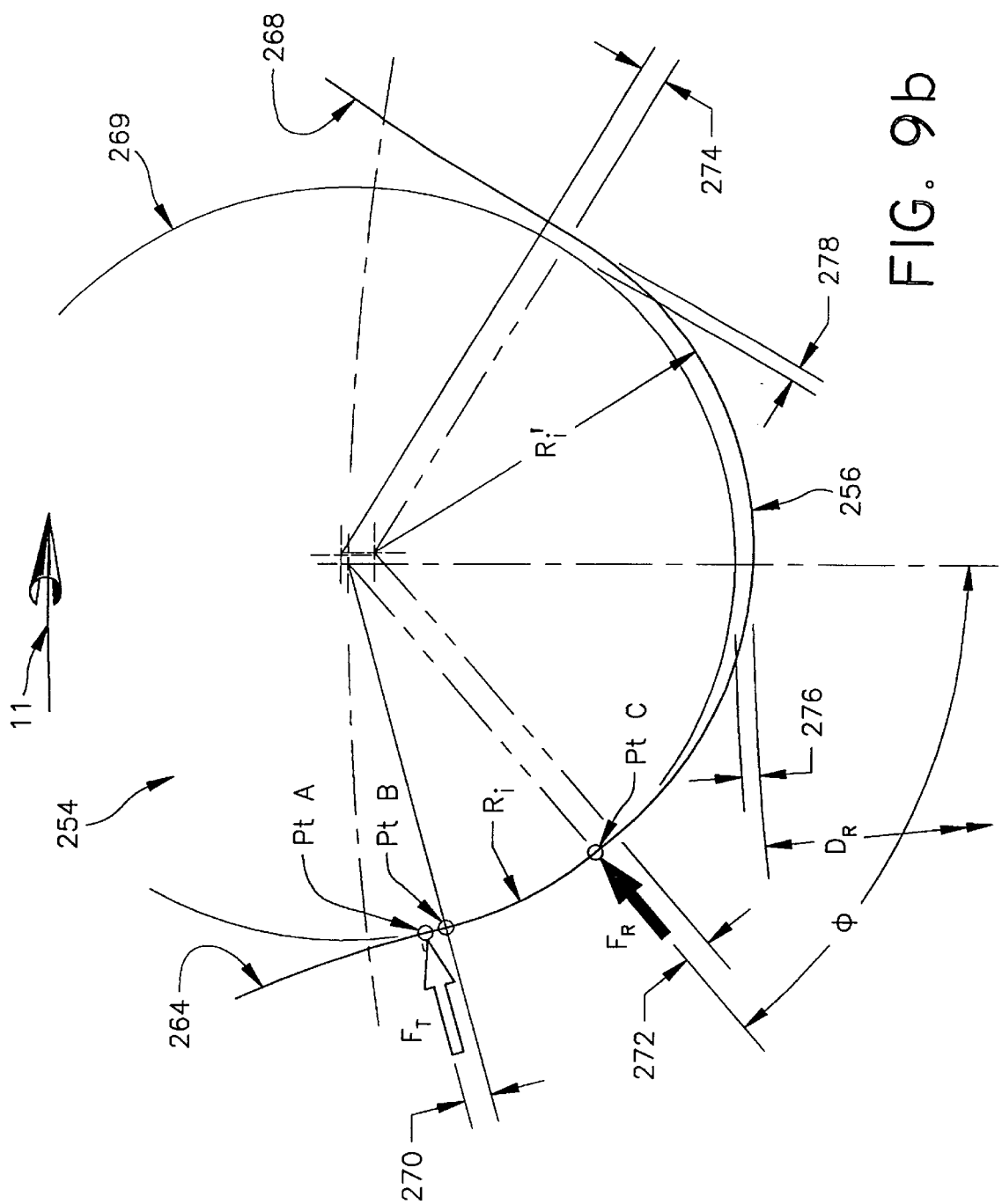
FIG. 9b is an enlarged partial view of the first asymmetrical tooth space profile of FIG. 9 showing a roller fully seated in two-point mesh.
Figure 9C:
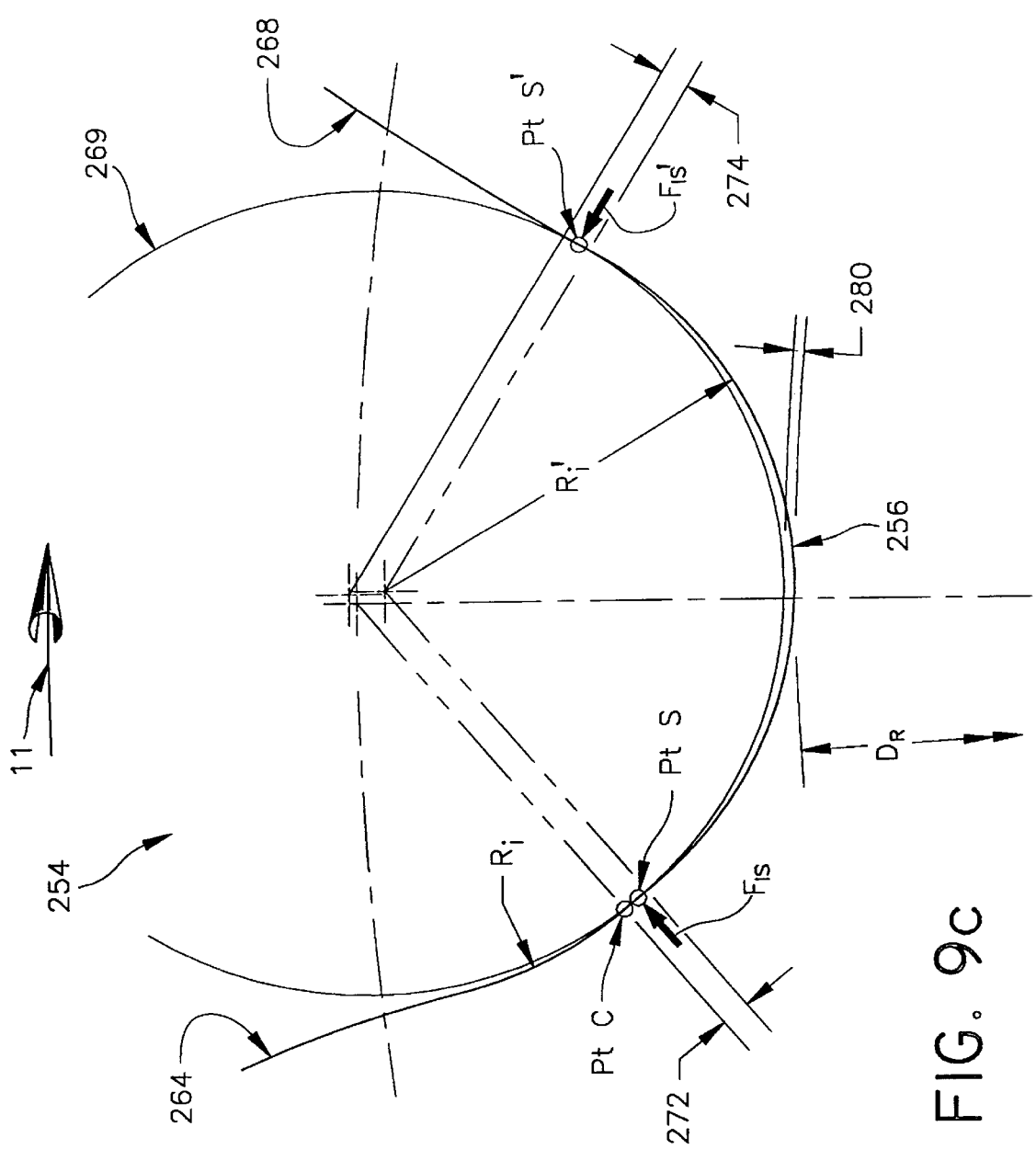
FIG. 9c is an enlarged partial view of the first asymmetrical tooth space profile of FIG. 9 showing a roller seated at the lower flank Points S and S.

Referring now to FIGS. 9 through 9c, the sprocket 212 includes a first tooth 262 having an engaging side or flank 264, and a second tooth 266 having a disengaging side or flank 268. The engaging flank 264 and disengaging flank 268 cooperate to define one of the tooth spaces 254 for receiving a roller associated with the chain 216, such as roller 269. Thus, the sprocket tooth 262 is necessarily classified as one of the teeth 250, and the sprocket tooth 266 can be classified as either one of the sprocket teeth 250 or 252.

The engaging roller 269 has a roller diameter $D_1$, and is shown fully seated in two-point contact within the tooth space 254. More particularly, the engaging roller 269 contacts two lines or ridges B and C that extend axially along the engaging flank surface or face (i.e. in a direction orthogonal to the plane of the drawings) when fully seated in driving contact within the tooth space 254. However, to facilitate a description thereof, the lines or ridges B and C are hereafter shown and referred to as contact points within the tooth space.

The engaging flank 264 has a radius $R_f$ that is tangent to a radially outer end of a flank flat 270. A first portion of the root surface 256, defined by radius $R_i$, is tangent to a radially inner end of the flank flat 270 at one end thereof, and tangent to a radially outer end of a first non-functional flat surface (not shown) that extends radially outward from Point C, at the other end thereof. As best shown in FIG. 9a, a maximum value for the root radius $R_i$ must be equal to, or less than, a minimum roller radius $0.5D_1$ in order to insure that two-point/line contact occurs at Points B and C. As a result of $R_i < 0.5D_1$, a small clearance 273 is defined between the root surface 256 and the roller 269 when the roller is seated at Points B and C.

A second non-functional flat surface (not shown) extends between Point B and a radially outer end of the root surface portion defined by radius $R_i$. The second non-functional flat surface is contiguous with the flank flat 270. That is, a first portion of the flank flat 270 extends radially outward from Point B to facilitate "staged" roller-sprocket meshing. A second, non-functional, portion of the flank flat 270 extends radially inward of Point B and cooperates with the first non-functional flat surface extending radially outward from Point C to facilitate the roller seating in two-point contact at Points B and C.

Referring again to FIG. 9, the location of the flank flat 270 is determined by the angle β, with the flat orientation being normal or perpendicular to a line that passes through Point B and the center (Point X) of roller 269 when the roller is contacting the sprocket at Points B and C. The length of the flank flat portion that extends radially outward from Point B affects a time delay between an initial tangential impact between sprocket 212 and roller 269 at the first contact Point A along the flank flat 270, and a subsequent radial impact at Point C. It should be appreciated that the pressure angle γ (described further below), the amount of pitch mismatch between the chain and the sprocket, and the length of the flank flat can be varied to achieve a desired initial roller contact Point A at the onset of roller-sprocket meshing. It should also be appreciated that, under theoretical conditions, initial roller-sprocket contact occurs at Point B. However, for all other pitch mismatch conditions, the initial contact occurs at Point A, which is offset from Point B. Thus, for all but the theoretical condition, the initial tangential contact occurs at Point A at the onset of mesh, with its related impact force $F_T$ (FIG. 9b).

The roller 269 is believed to stay in hard contact with the flank flat 270 from Point A to Point B as the sprocket rotation moves the roller into full mesh with subsequent radial contact at Point C. The radial impact force $F_R$ (FIG. 9b) does not occur until the sprocket has rotated sufficiently to bring roller 269 into radial contact at Point C. Thus, the radial impact force $F_R$ occurs at the instant of full mesh. The force vector $F_R$ is shown in solid to indicate the occurrence of the radial impact at Point C, and the tangential impact force vector $F_T$ is shown in outline to indicate the previous occurrence of the tangential impact at Point A.

The taut strand load transfer to the meshing roller is considered to be complete at full mesh. At the instant of the radial collision by roller 269 at Point C, with its resultant radial impact force $F_R$, the tangential impact force of $F_T$ has already occurred and is no longer a factor. The time delay ("staged" engagement) between the tangential and radial roller-sprocket collisions effectively spreads the impact energy occurring during the meshing process over a greater time interval, thereby reducing its contribution to the generated noise level at mesh frequency. Additionally, the present asymmetrical sprocket tooth profile beneficially permits a more gradual taut strand load transfer from a fully engaged roller to a meshing roller as the meshing roller moves from its Point A initial mesh to its full two-point mesh position at Points B and C.

Referring again to FIG. 9, the root surface 256 incorporates root relief. That is, a second flat surface 272 extends radially inward from Point C. A second portion of the root surface 256, defined by the radius $R_i'$, is tangent to a radially inner end of the flat surface 272 and is tangent to a radially inner end of a third flat surface 274. The disengaging flank 268, defined by the radius $R_f'$, is tangent to a radially outer end of the third flat surface 274.

It should be appreciated that the non-functional flat surface extending radially outward from Point C is contiguous with the flat surface 272. That is, a first portion of the flat surface 272 extends radially outward from Point C and cooperates with the second non-functional flat surface extending radially inward from Point B (associated with the flank flat 270) to cause the roller to seat in two-point contact at Points B and C. A second portion of the flat surface 272 extends radially inward of Point C and cooperates with the third flat surface 274 to provide root relief.

A clearance 276 exists between the roller 269 and the relieved root surface 256 when the roller 269 is seated in full mesh at Points B and C. For the root relieved tooth space 254, the roller 269 contacts point B at full mesh when its center is on the theoretical pitch diameter PD. The second root radius $R_i'$ is necessarily equal to, or less than, one-half the diameter $D_1$ of roller 269. FIG. 9b illustrates the roller clearance 278 to the disengaging flank 268 for the full mesh position of the roller 269 at points B and C.

With reference now to FIG. 9c, root relief is defined herein as the clearance 280 that exists between the roller 269 and the relieved root surface 256 when the roller 269 bridges across the root and seats at points S and S' on the opposing engaging and disengaging flanks 264, 268, respectively. Thus, the roller 269 is prevented from contacting the root surface 256 when the sprocket 212 rotates to the point that the roller 269 bridges across the root and seats at points S and S' on the opposing engaging and disengaging flanks 264, 268, respectively. In particular, FIG. 9c illustrates the point at which the roller 269 is moved radially inward from Point C and contacts the lower flanks at Points S and S' during rotation of the sprocket 212 around the sprocket wrap 232 (FIG. 7). It should be appreciated that, as the roller continues to travel around the sprocket wrap, the roller moves outward from Point S' along the disengaging flank 268.

In order for the roller 269 to advance into contact with the lower flanks at Points S and S', the roller must advance from the two-point full mesh position and move radially inward from the pitch circle diameter PD by a radial distance. If under some severe operating conditions, the chain drive dynamics force roller 269 to impact the lower flank surfaces of the tooth space 254, the roller is constrained by the meshing geometry which requires the roller to make its initial tangential contact with the sprocket tooth at Point A, then move to its full two-point mesh position at Points B and C before it can progress forward and radially inward to Points S and S', which also will require further compression of the cushion rings 244 (described further below) as the roller travels a radially inward path.

Figure 3:
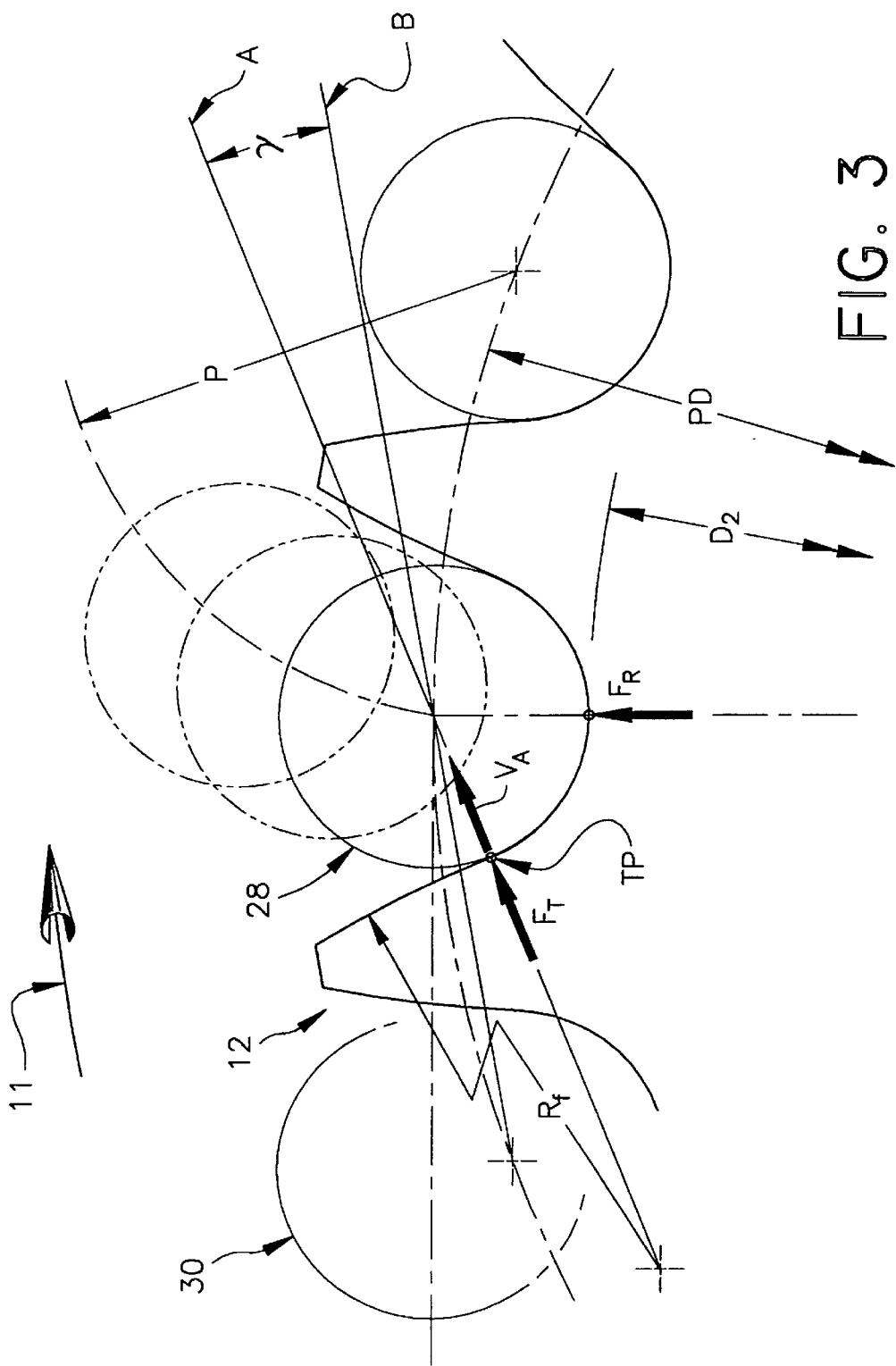
FIG. 3 is an enlarged partial view of the drive sprocket of FIG. 2 showing an engagement path (phantom) and a roller (solid) in a driving position as the drive sprocket rotates in a clockwise direction.
Figure 6:
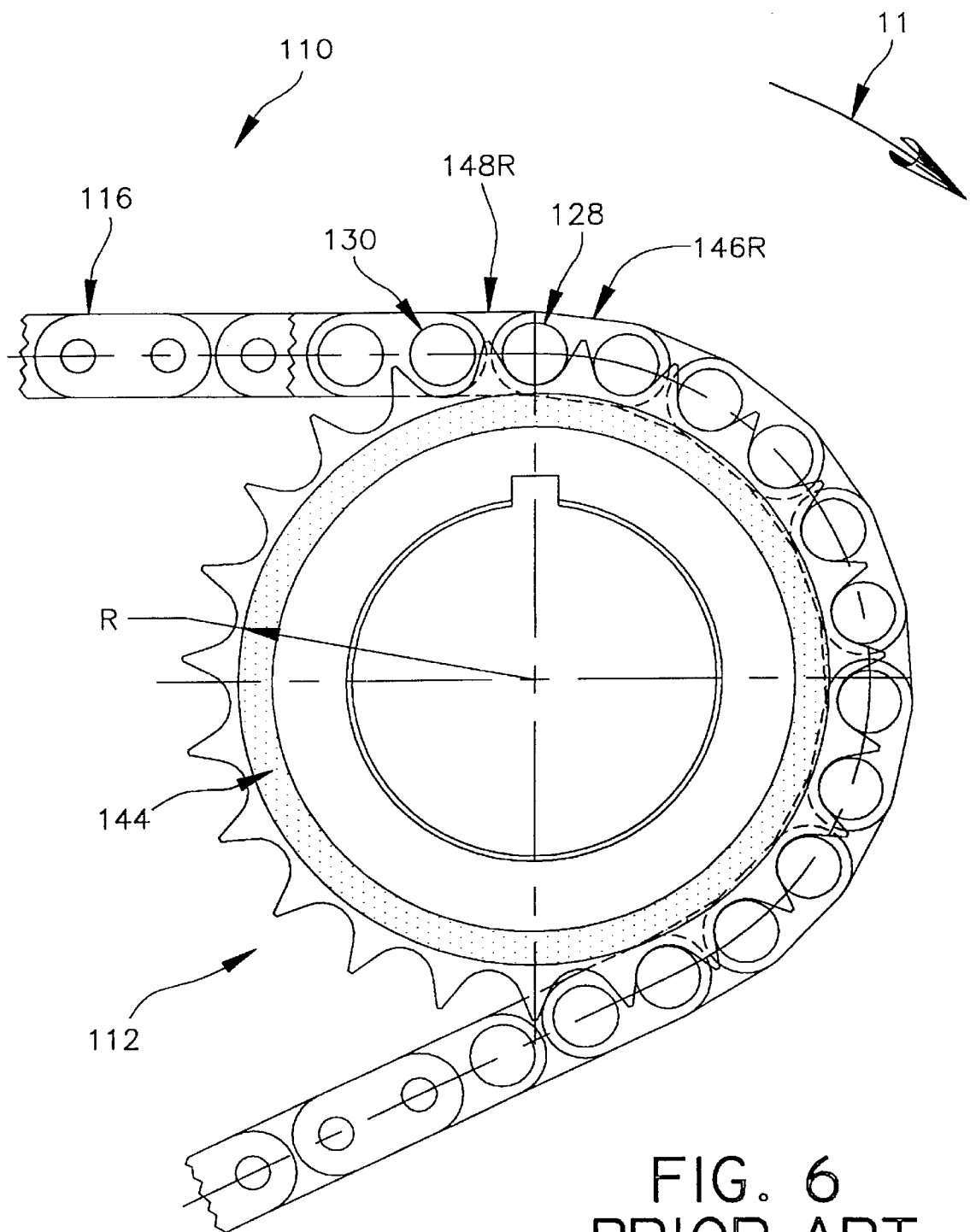
FIG. 6 illustrates an exemplary ISO-606 compliant drive sprocket incorporating a conventional cushion or damper ring on each face thereof.

The meshing geometry for the present asymmetrical tooth profile, along with the favorable roller-sprocket seating geometry at Points S and S', provide a superior noise attenuation to that of the conventional ISO-606 rubber cushion ring system of FIG. 6. The impact vectors $F_{I_S}$ and $F_{I_S}'$ (FIG. 9c) occur sequentially following the initial tangential contact and subsequent two-point seating. The ISO-606 radial (root) impact vector $F_R$ (FIG. 3), on the other hand, is believed to be the initial roller-sprocket impact before the roller then moves into driving position on the engaging flank.

The engaging flank roller seating angle β (FIG. 9) and a disengaging flank roller seating angle β' replace the ISO-606 roller seating angle α. The pressure angle γ is a function of the engaging flank roller seating angle β. That is, as β increases, γ decreases. A minimum asymmetrical pressure angle can be determined from the following equation, where:

$$\gamma_{min} = \beta_{max} - (\alpha_{imax}/2 + \gamma_{ISO\ min})$$

Therefore, an asymmetrical pressure angle $\gamma_{min}=0$ when $\beta_{max}=(\alpha_{max}/2+\gamma_{ISO\ min})$ as illustrated in the Table of FIG. 5. FIG. 5 lists the maximum Beta (β) angles and the corresponding pressure angles (γ) for several sprocket sizes and several asymmetrical profiles. It should be appreciated that reducing the engaging flank pressure angle γ reduces the tangential impact force component $F_T$ (FIG. 9b) and thus the tangential impact noise contribution to the overall noise level at the onset of engagement.

The impact force $F_T$ is a function of the impact velocity which in turn is related to pressure angle γ. As pressure angle γ is reduced, it provides a corresponding reduction in the impact velocity between the chain and the sprocket at the onset of meshing resulting in improved NVH characteristics. A minimum pressure angle γ also facilitates a greater separation or distance between tangential contact points A and B to further increase or maximize engagement "staging". In the preferred embodiment, the engaging flank pressure angle γ is in the range of about −2.0° to about +5° to optimize the staged impact between the roller and the sprocket.

In the embodiment being described, roller seating angle β is greater than ISO $\alpha_{max}/2$ at a maximum material condition and β can be adjusted until a desired engaging flank pressure angle γ is achieved. For instance, the roller seating angle β can provide a pressure angle γ that is less than zero, or a negative value. It is believed that a small negative pressure angle for the theoretical chain/sprocket interface beneficially provides a pressure angle γ closer to zero (0) for a "nominal" system or for a system with wear. However, the engaging flank roller seating angle β may be beneficially adjusted so as to provide any engaging flank pressure angle γ having a value less than the minimum ISO-606 pressure angle.

It should be noted that chordal pitch reduction may be required when the pressure angle γ has a negative value. Otherwise, a roller would interfere with the engaging flank (with a maximum material sprocket and a theoretical pitch [shortest] chain) as it exits the sprocket wrap back into the span. Also, the reduced chordal pitch assists the staged mesh as previously mentioned.

In addition, the disengaging flank roller seating angle β' (FIG. 9) may be adjusted to have a maximum value which is equal to $\alpha_{min}/2$ or even less. This reduced seating angle β' promotes faster separation when the roller leaves the sprocket and enters the span. This reduced angle β' also allows for the roller in a worn chain to ride up the coast flank surface to a less severe angle as the roller moves around the sprocket in the wrap.

Figure 10:
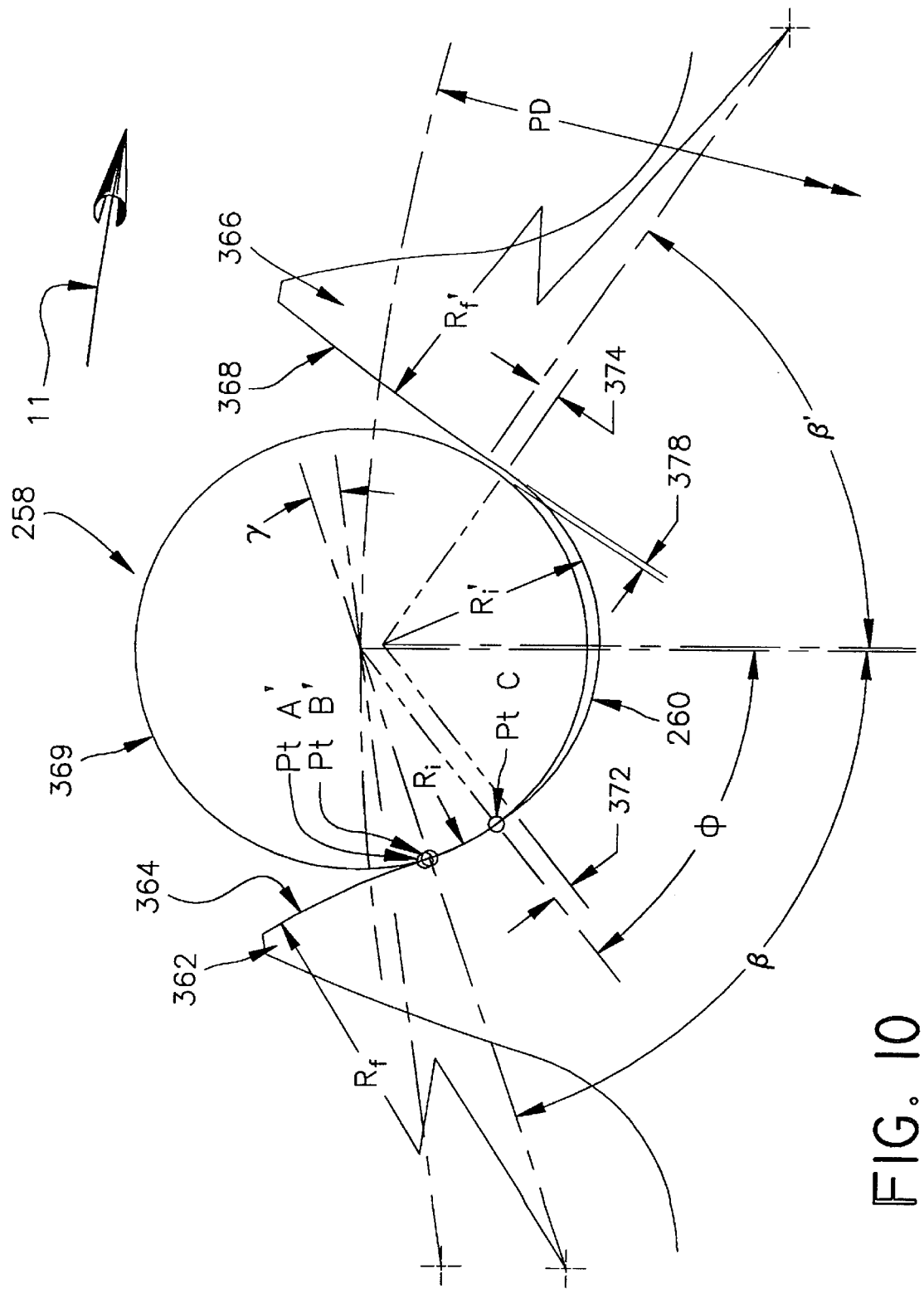
FIG. 10 illustrates a second asymmetrical tooth space profile for the sprocket of FIG. 8.

Referring now to FIG. 10, the sprocket 212 also includes a third tooth 362 having an engaging side or flank 364, and a fourth tooth 366 having a disengaging side or flank 368. The engaging flank 364 and disengaging flank 368 cooperate to define one of the tooth spaces 258 for receiving a roller associated with the chain 216, such as roller 369. Thus, the sprocket tooth 362 is necessarily classified as one of the numbered sprocket teeth 252 (FIG. 8), and the sprocket tooth 366 can be classified as either one of the sprocket teeth 250 or 252.

The engaging roller 369 has a roller diameter $D_1$, and is shown fully seated in two-point contact within the tooth space 258. The engaging roller 369 initially contacts the engaging flank 364 at point A' before fully seating in the tooth space at points B' and C. As described above with respect to the asymmetrical tooth space 254, contact points B' and C are actually lines that extend axially along each sprocket tooth surface (i.e., in a direction orthogonal to the plane of the drawings).

The engaging flank 364 has a radius $R_f$ which is tangent to a first non-functional flat surface (not shown) at contact point B'. The flat surface, which functions only to facilitate two-point roller contact, extends radially inward from point B'. A first portion of the root surface 260 defined by radius $R_i$ is tangent to a radially inner end of the first non-functional flank surface at one end thereof, and tangent to a radially outer end of a second non-functional flat surface (not shown) that extends radially outward from Point C, at the other end thereof. More particularly, a maximum value for the root radius $R_i$ must be equal to, or less than, a minimum roller radius $0.5D_1$ in order to insure two-point/line contact at Points B' and C. As a result of $R_i<0.5D_1$, a small clearance (see clearance 272, FIG. 9a) is defined between the root surface 260 and the roller 369 when the roller is seated at Points B' and C.

The location of the first non-functional flat surface is determined by the angle β, with the flat orientation being normal or perpendicular to a line that passes through Point B' and the center of roller 369 when the roller is contacting the sprocket at Points B' and C. It should be appreciated that the pressure angle γ, and the amount of pitch mismatch between the chain and the sprocket, can be varied to achieve a desired initial roller contact Point A' at the onset of roller-sprocket meshing. Under theoretical conditions initial roller-sprocket contact occurs at Point B'. However, for all other pitch mismatch conditions, the initial contact occurs at Point A', which is shown to be offset from Point B'.

Thus, for all but the theoretical condition, the initial tangential contact occurs at Point A' at the onset of mesh. The roller 369 is believed to stay in hard contact as the sprocket rotation moves the roller from its initial tangential impact at Point A' into full mesh position at Point B' with its resulting radial contact at Point C. The radial impact force does not occur until the sprocket has rotated sufficiently to bring roller 369 into radial contact at Point C.

Thus, the radial impact force $F_R$ occurs at the instant of full mesh. The taut strand load transfer to the meshing roller is considered to be complete at full mesh. At the instant of the radial collision by roller 369 at Point C, with its resultant radial impact force, the tangential impact force has already occurred and is no longer a factor. The time delay ("staged" engagement) between the tangential and radial roller-sprocket collisions effectively spreads the impact energy occurring during the meshing process over a greater time interval, thereby reducing its contribution to the generated noise level at mesh frequency. Additionally, the asymmetrical sprocket tooth profile beneficially permits a more gradual taut strand load transfer from a fully engaged roller to a meshing roller as the meshing roller moves from its Point A' initial mesh to its full two-point mesh position at Points B' and C.

The root surface 260 incorporates root relief. That is, a second flat surface 372 extends radially inward from Point C. A second portion of the root surface 260, defined by the radius $R_i'$, is tangent to a radially inner end of the flat surface 372 and is tangent to a radially inner end of a third flat surface 374. The disengaging flank, defined by the radius $R_f'$, is tangent to a radially outer end of the third flat surface 374.

It should be appreciated that the second non-functional flat surface (extending radially outward of Point C) is contiguous with the flat surface 372. That is, a first portion of the flat surface 372 extends radially outward from Point C and cooperates with the first non-functional flat surface extending radially inward from Point B to facilitate the roller seating in two-point contact at Points B' and C. A second portion of the flat surface 372 extends radially inward of Point C and cooperates with the third flat surface to provide root relief.

As indicated above, a clearance 376 exists between the roller 369 and the relieved root surface 260 when the roller 369 is seated in full mesh at Points B' and C. For the root relieved tooth space 258, the roller 369 contacts point B' at full mesh when its center is on the theoretical pitch diameter PD. The second root radius $R_i'$ is necessarily equal to, or less than, one-half the diameter of roller 369. FIG. 10 also illustrates the roller clearance 378 to the disengaging flank 368 for the full mesh position of the roller 369 when seated at points B' and C. The tooth space 258 provides root relief in the same manner as the tooth space 254. That is, the roller 369 is prohibited from contacting the root surface 260 when the roller bridges across the root surface and seats at points S and S' (see clearance 280, FIGS. 9 and 9a). Thus, the roller 369 can contact only the lower engaging and disengaging flanks. It should be appreciated that as the roller continues to travel around the sprocket wrap, the roller moves outward from Point S' along the disengaging flank 368.

Pitch mismatch is inherent in a chain/sprocket interface except at one condition—the theoretical condition which is defined as a chain at its shortest pitch (shortest being theoretical pitch) and a maximum material sprocket. This theoretical condition therefore defines one limit (zero, or no pitch mismatch) of the tolerance range of the pitch mismatch relationship of chain and sprocket. The other limit is defined when a longest "as built" chain is used with a sprocket at minimum material conditions—or in other words, a sprocket having a minimum profile. This limit produces the greatest amount of pitch mismatch. The pitch mismatch range is therefore determined by the part feature tolerances.

Additional pitch mismatch may be introduced to facilitate a greater time delay between tangential contact at point A (for the asymmetrical tooth spaces 254) and tangential contact at point A' (for the asymmetrical tooth spaces 258). That is, varying the time at which the initial roller-to-sprocket contact occurs for each tooth space 254, 258 results in reduced mesh frequency noise because the point and rhythm of the initial roller-to-sprocket contact is altered. The time delay between the roller-to-sprocket contact at points A and A' may be increased by increasing the mismatch between the chain pitch and sprocket pitch.

Additional pitch mismatch may also be introduced to facilitate a "staged" roller contact for each tooth space. That is, additional pitch mismatch increases the time delay between initial tangential contact and the fully seated radial contact for each tooth space 254, 258. It should be appreciated that staged contact is greater for the tooth space 254 than for the tooth space 258 due to the flank flat 270 which causes initial contact to occur higher up on the engaging flank of the sprocket teeth 250.

The sprocket chordal pitch is necessarily shorter than the chain pitch to facilitate the "staged" roller-tooth contact. In addition, chordal pitch reduction also provides roller-to-flank clearance as the roller exits the sprocket wrap back into the strand. Added chordal pitch reduction, when used, is preferably in the range of 0.005–0.030 mm.

Figure 11:
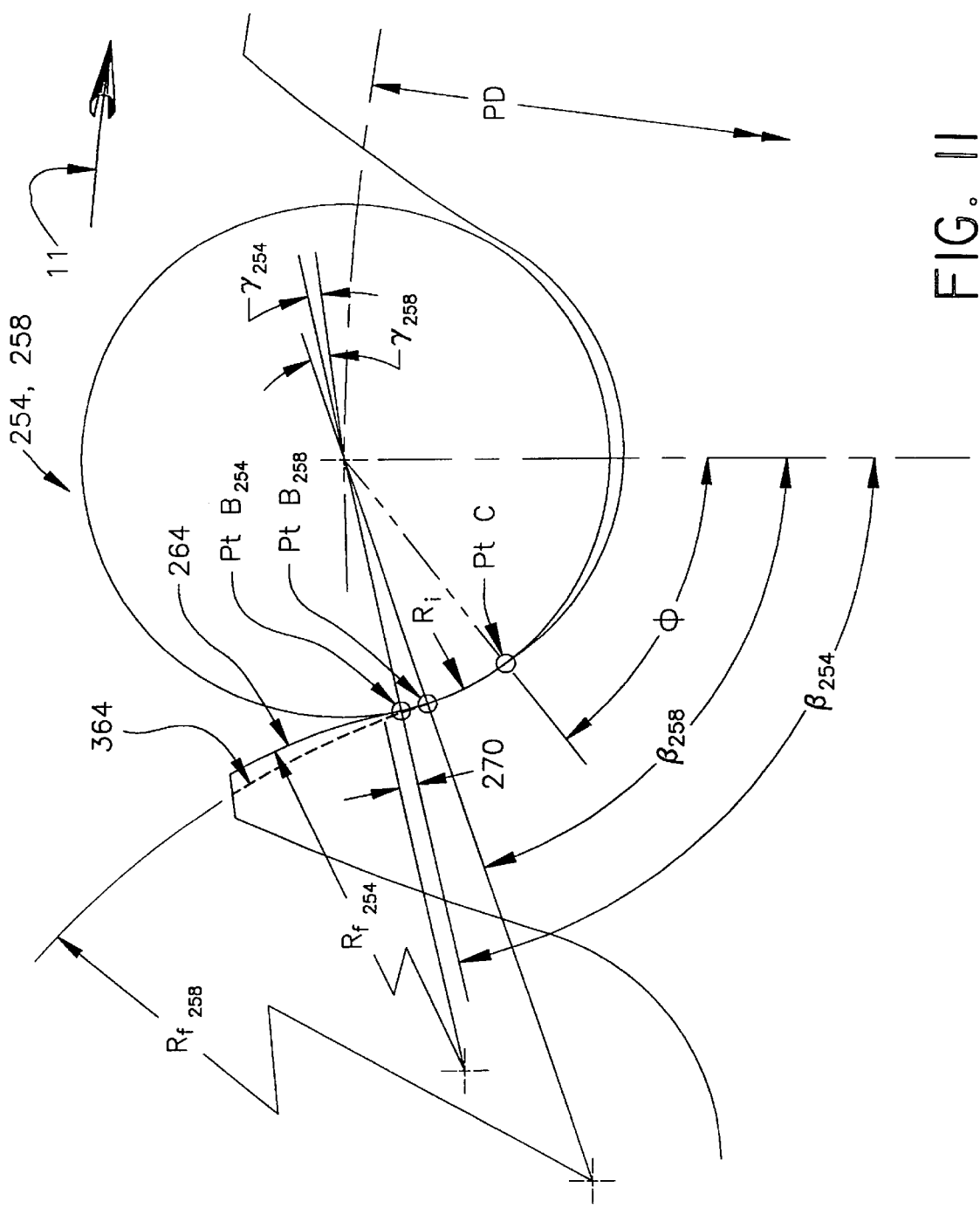
FIG. 11 illustrates the asymmetrical tooth profile of FIG. 9 overlaid with the asymmetrical tooth profile of FIG. 10.

The staged roller contact for each tooth space 254, 258 may be further assisted by providing sprocket tooth pressure angles γ that are substantially less than the ISO standard. Pressure angles γ equal to or very close to zero (0), or even negative pressure angles, are contemplated. For instance, FIG. 11 illustrates one embodiment of the random engagement drive sprocket 212 wherein the pressure angles γ for the tooth spaces 254, 258 are different. That is, both pressure angles γ are either a positive value or zero, but the pressure angle $\gamma_{254}$ for tooth space 254 is smaller than the pressure angle $\gamma_{258}$ for tooth space 258 (and the roller seating angle $\beta_{254}$ is greater than the roller seating angle $\beta_{258}$) Thus, $\gamma_{min}$ may be equal to 0° for the tooth space 254, $\gamma_{min}$ may be equal to +4° for the tooth space 258, and $\beta_{max}$ for both tooth spaces will always be less than the ISO minimum pressure angle (the feature tolerance band or range for $\gamma_{min}$ and $\gamma_{max}$ is the same for both tooth spaces 254, 258).

As a result, initial roller-to-sprocket contact occurs at point A followed by subsequent radial contact at points B and C for the tooth space 254. And, initial roller-to-sprocket contact occurs at point A' followed by subsequent radial contact at points B' and C for the tooth space 258. The sprocket 212 can incorporate additional chordal pitch reduction, and can incorporate tooth space clearance (TSC), as described in U.S. Pat. No. 5,921,878, the disclosure of which is hereby incorporated by reference for all that it teaches. Tooth space clearance (TSC) enables rollers of a worn chain to be maintained in hard contact with one or more inclined root surfaces of the sprocket teeth. That is, one or more of the flat surfaces 272, 274 (FIG. 9) and 372, 374 (FIG. 10) can be used to compensate for chain pitch elongation or chain wear by accommodating a specified degree of chain pitch elongation ΔP. In addition, the inclined root surfaces facilitate reducing the radial reaction force thereby reducing the roller radial impact noise contribution to the overall noise level. It should be appreciated that a shallow β' angle, in conjunction with tooth space clearance, helps maintain "hard" roller-sprocket contact for the rollers in the wrap.

Alternatively, the pressure angle $\gamma_{min}$ for the tooth spaces 254 may always be a negative value, while the pressure angle $\gamma_{min}$ for the tooth spaces 258 may always be a positive value or zero. For instance, $\gamma_{min}$ may be equal to −3° for the tooth spaces 254, $\gamma_{min}$ may be equal to +3° for the tooth spaces 258, and $\gamma_{max}$ for both profiles will always be less than the ISO minimum pressure angle. With this embodiment, additional chordal pitch reduction will always be included, however, tooth space clearance may or may not be included. In yet another embodiment, the tooth spaces 254, 258 can have the same, or at least substantially the same, pressure angles γ (thus, the tooth spaces have the same or at least substantially the same roller seating angles $\beta_{254}$ and $\beta_{258}$).

Figure 12:
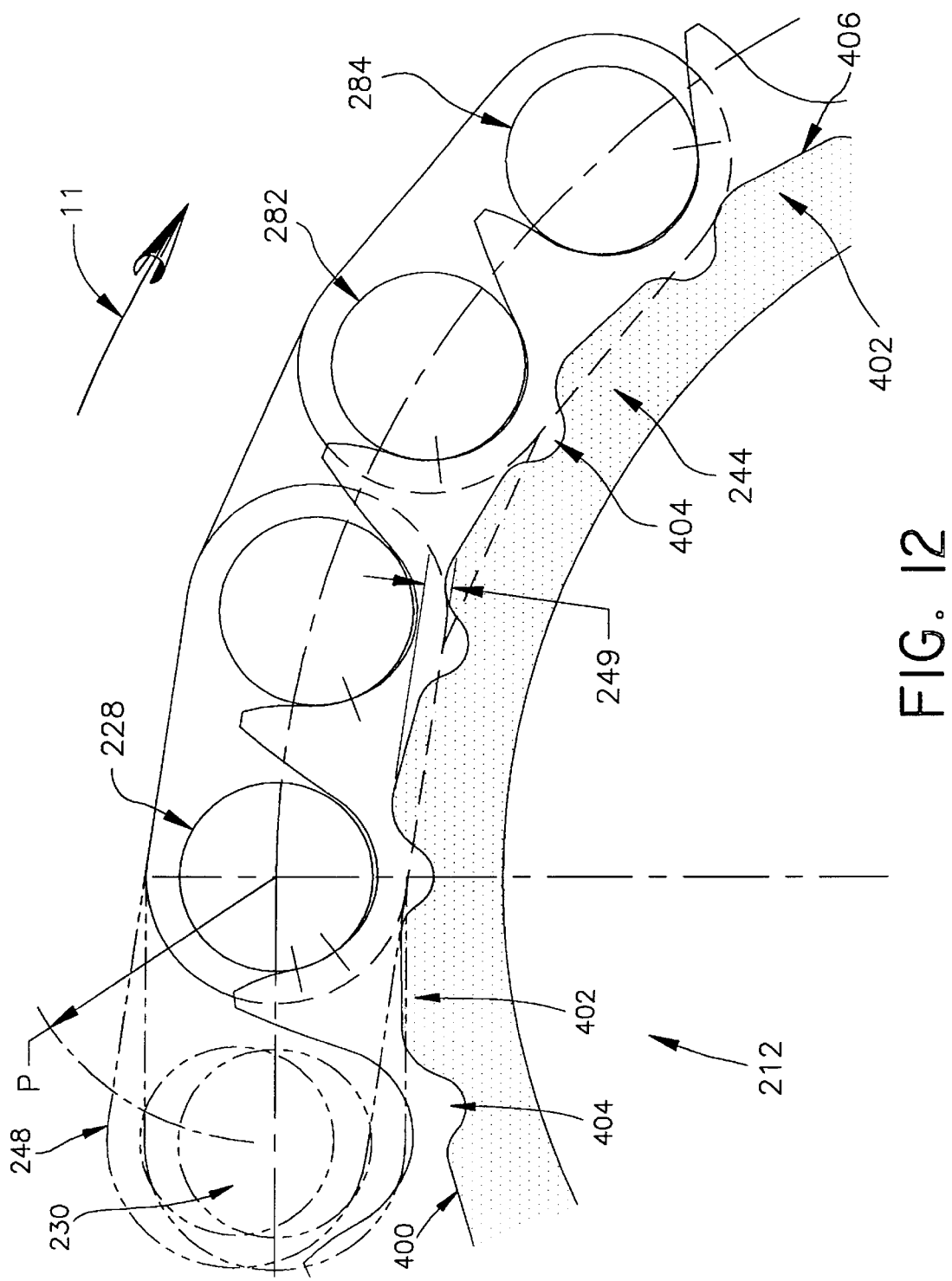
FIG. 12 is an enlarged partial view of the random-engagement roller chain drive sprocket of FIG. 7 at the taut strand-sprocket interface.

FIG. 12 illustrates the path (phantom) that each of the roller link plates, such as roller link plates 248, follow as they come into meshing contact with the sprocket 212. The roller links plates 248 pivot about the center of fully meshed roller 228 and compress the resilient cushion or damping rings 244 as the roller 230 moves into meshing engagement in the corresponding sprocket tooth space.

Figure 12A:
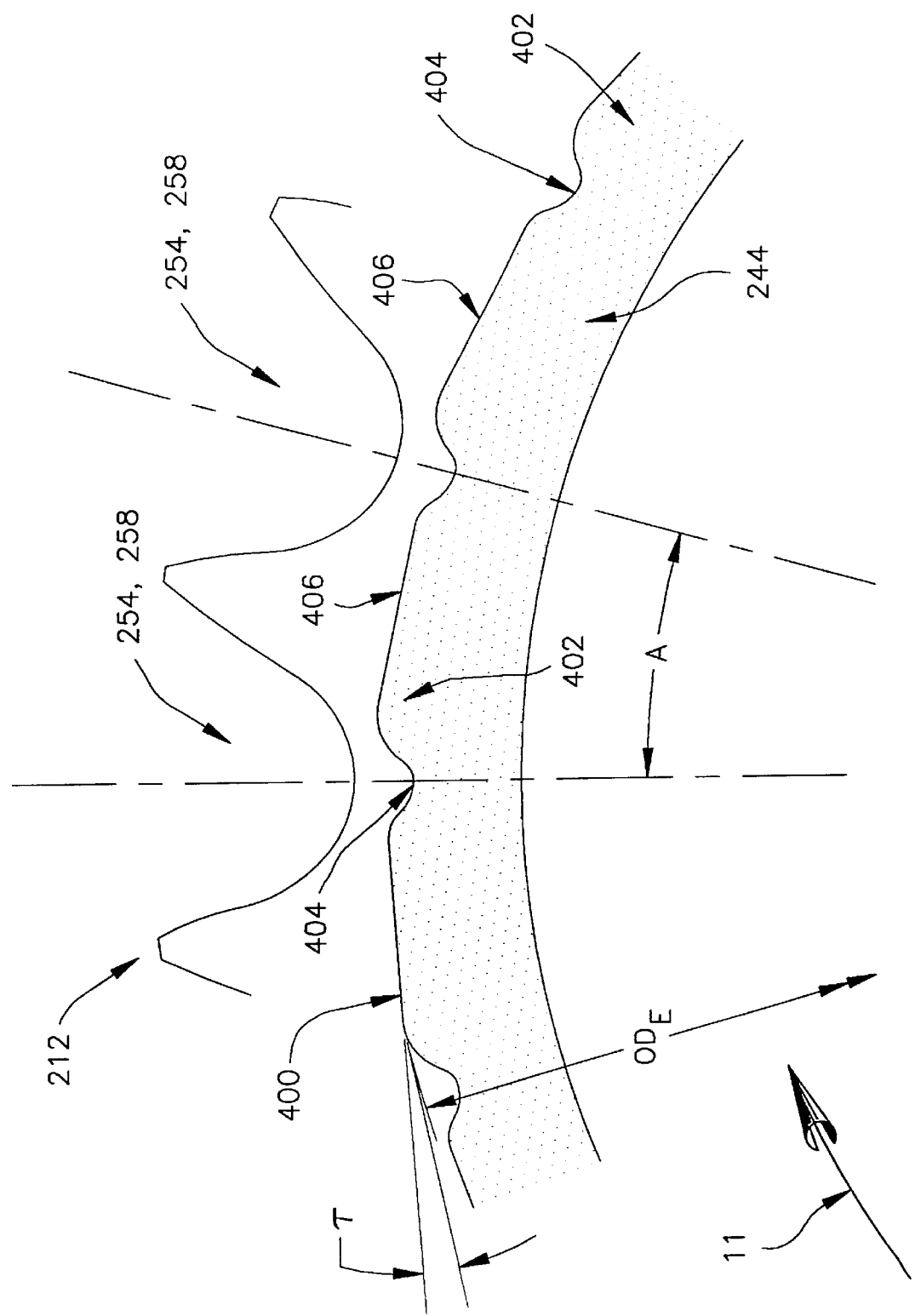
FIG. 12a is an enlarged partial view of the random-engagement roller chain drive sprocket of FIG. 8.

With continuing reference to FIG. 12, and particular reference to FIG. 12a, the elastomeric damping rings 244 each include an uneven or undulated outer surface 400 formed from alternating compression pads 402 and transverse grooves 404. The compression pads 402 each have an inclined outer surface 406 which is defined, in part, by an outer diameter $OD_E$ and an angle τ. That is, each outer surface 406 extends at an angle τ from a trailing end of the outer surface, occurring at the outer diameter $OD_E$, to a leading end of the outer surface 406.

Thus, the outer surface 406 of each compression pad 402 is inclined such that minimum compression will occur in the proximity of the seated and pivoting roller 228, with increased compression beneficially occurring moving counterclockwise on the pad surface 406 toward meshing roller 230. In other words, the compression gradient is beneficially skewed toward the meshing roller 230 where the compression can provide a greater resistance to meshing impact farther from the pivot point of the link plates 248 because of the inherent mechanical advantage with a longer lever or moment arm.

The transverse grooves 404 provide for minimum or no compression for that portion of the link plates located at the seated and pivoting roller 228, where compression would provide little or no benefit. Further, the grooves 404 provide voids or spaces for the elastomeric material forming the more highly-compressed trailing ends (occurring at the outer diameter $OD_E$) of the pads to move into during meshing and subsequent rotation through the sprocket wrap 232 (FIG. 7).

Figure 12B:
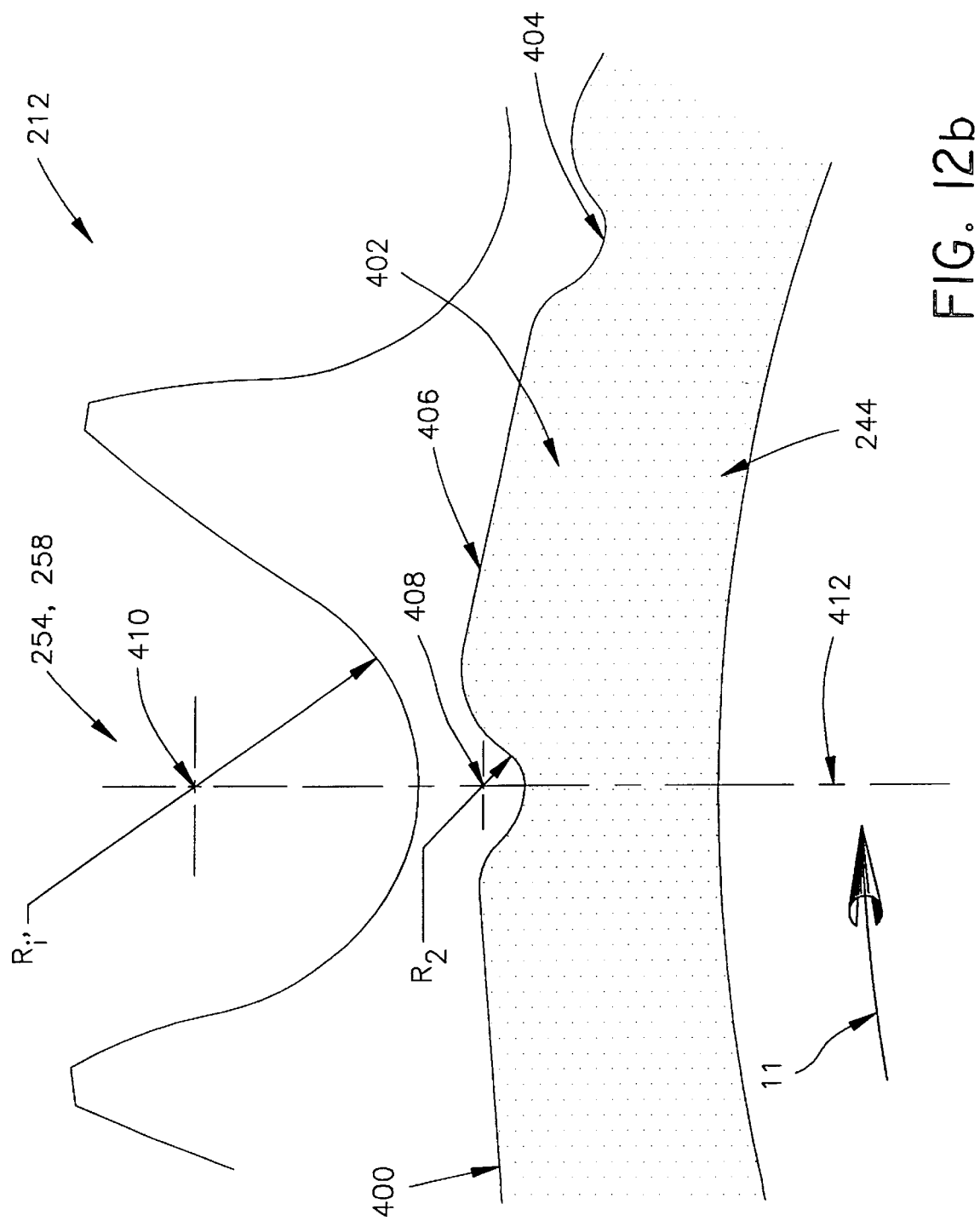
FIG. 12b is an enlarged partial view of the sprocket FIG. 12a illustrating the positional relationship between the sprocket tooth spaces and the cushion ring pads and grooves.

With reference now to FIG. 12b, each groove 404 is defined by at least one radius $R_2$ extending from an arc center 408 of the groove 404 (in the embodiment being described, the grooves 404 are defined by at least two radii). Likewise, a portion of each root surface 256, 260 is defined by a radius $R_i'$ that extends from an arc center 410 of the root surface portion defined by the radius $R_i'$.

A radial line 412 can be drawn between the arc center 410 of the root surface portion defined by the radius $R_i'$ and the center of the sprocket 212. The cushion ring 244, and more particularly, the compression pads 402 and grooves 404, are oriented relative to the sprocket such that the arc centers 408 of the groove portions defined by the radii $R_2$ are positioned at least proximate the radial lines 412. Preferably, the radial line 412, connecting the arc center 410 of the root surface portion defined by the radius $R_i'$ and the center of the sprocket 212, passes through the arc center 408 of the groove portion defined by the radius $R_2$.

Figure 12C:
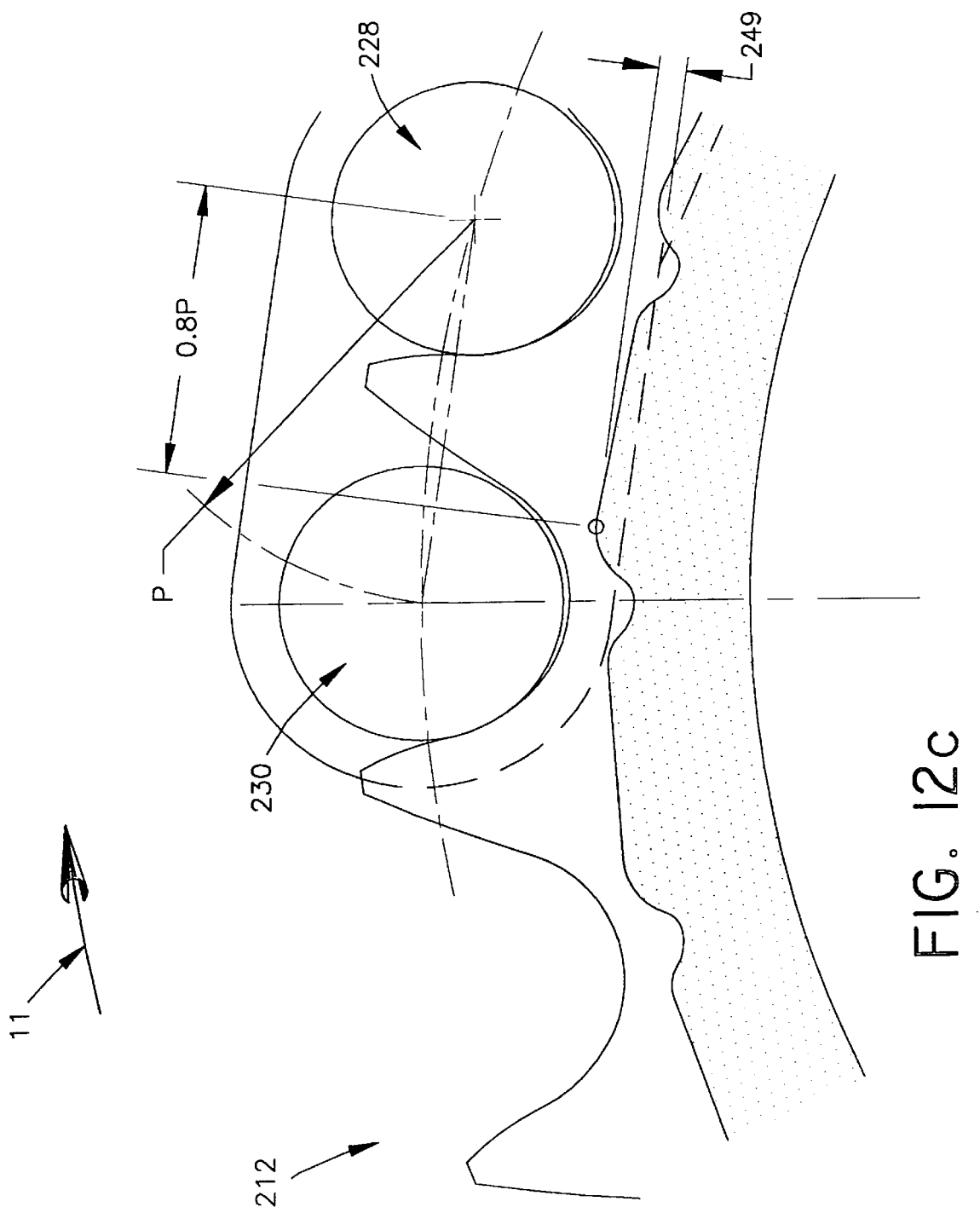
FIG. 12c is an enlarged partial view of the sprocket of FIG. 12 illustrating that the maximum damper ring compression occurs at approximately 0.8P from a seated roller.

Referring now to FIG. 12c, the sprocket 212 is rotated in a clockwise direction 11 until the instant the roller 230 is fully seated in two-point driving contact. With the grooves 404 oriented relative to the sprocket 212 as shown in FIG. 12b, the radially outermost or trailing end portions of the compression pads 402 are aligned or otherwise positioned such that the maximum damper ring compression 249 beneficially occurs at approximately 0.8P (where P is the sprocket pitch) from the roller 228.

Figure 12D:
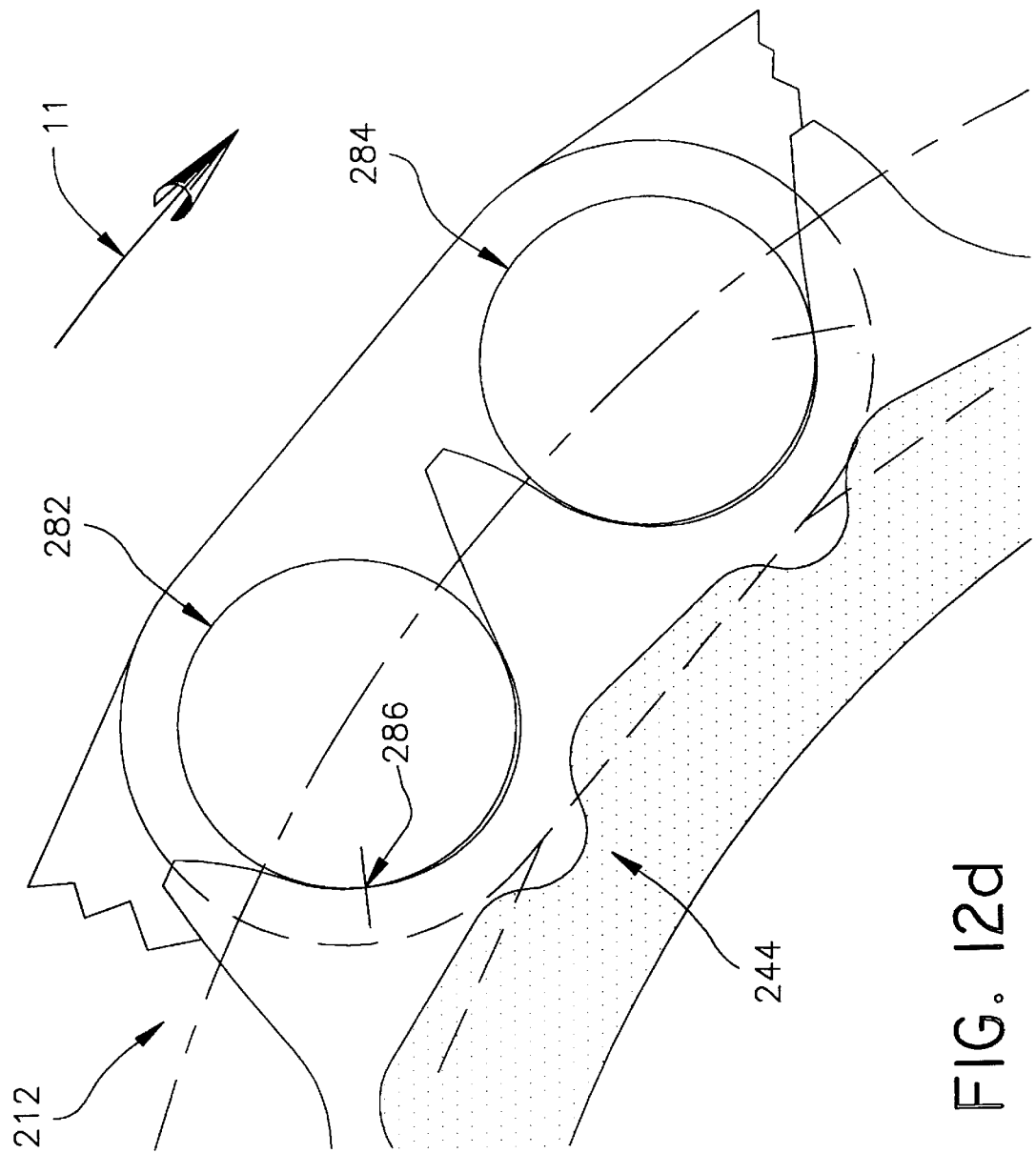
FIG. 12d is an enlarged partial view of the sprocket of FIG. 12.

Referring now to FIG. 12d, roller 252 is shown to be in contact with the engaging tooth flank at the point indicated by the short line 286 normal to the roller and tooth flank. And roller 250 is shown to be in contact with the disengaging tooth flank in the tooth space that it occupies. The forward progression of roller 250, in its angular position shown in FIG. 12d until it contacts the disengaging flank of the adjacent tooth, will take place somewhere between its present position and the angular position currently occupied by roller 250.

Figure 12E:
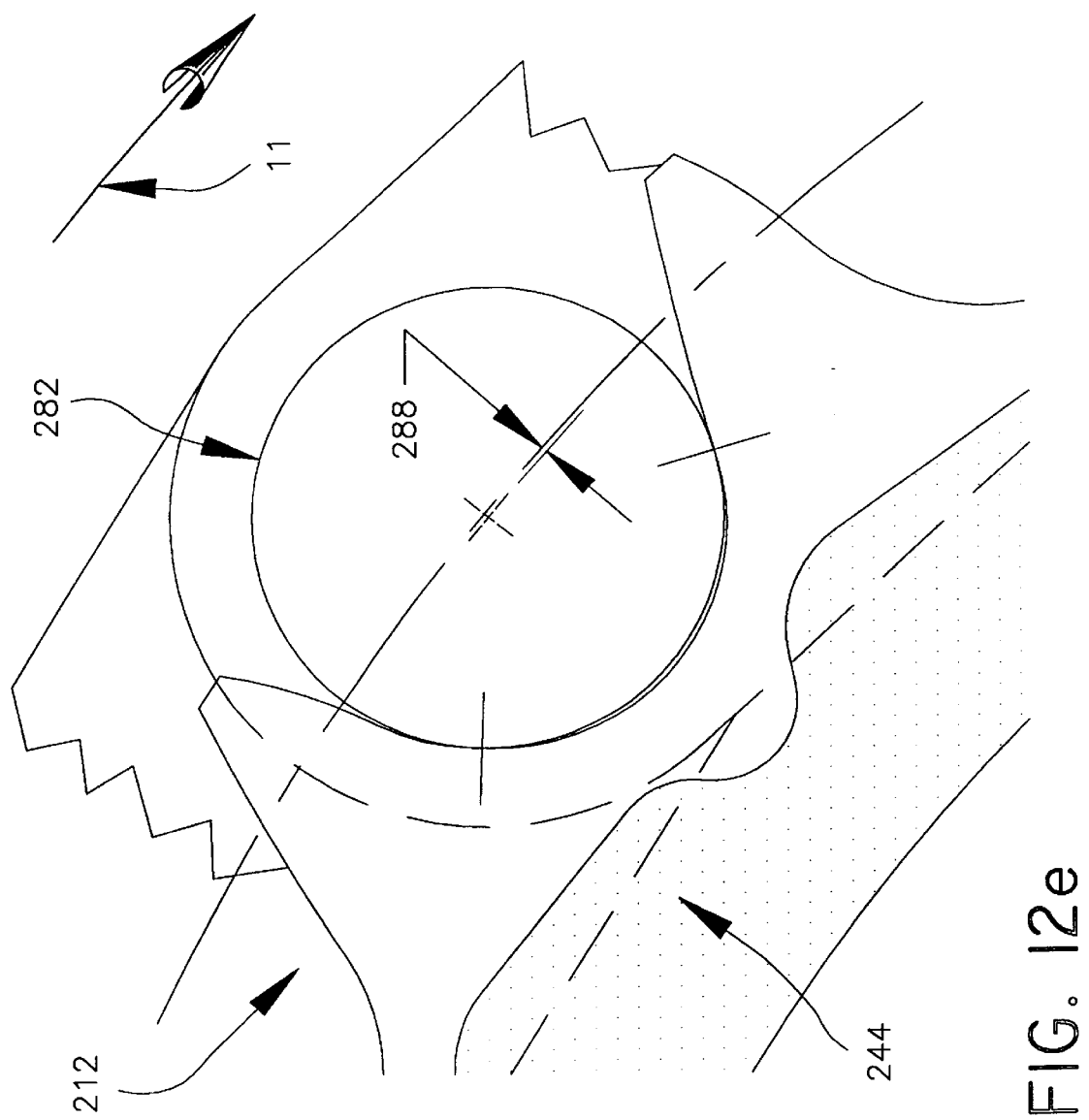
FIG. 12e is an enlarged partial view of the sprocket of FIG. 12d.

FIG. 12e shows sprocket 212 rotated in the direction of arrow 11 through some angle less than tooth angle A until the instant at which roller 282 contacts both flanks. As mentioned previously, roller 282 must move radially inward a radial distance 288, further compressing the rubber cushion ring 244, in order for contact to occur at Points S and S' on both flanks. The center of roller 282 may, in fact, stay on the pitch diameter PD as it progresses from the engaging flank contact to the disengaging flank contact. In either case, the rollers in the sprocket wrap 232 are prevented from vibrating, for which the vibrating rollers would cause intermittent contact with the sprocket teeth, resulting in undesired broadband noise and a further reduction in overall roller chain drive noise levels.

Figure 6A:
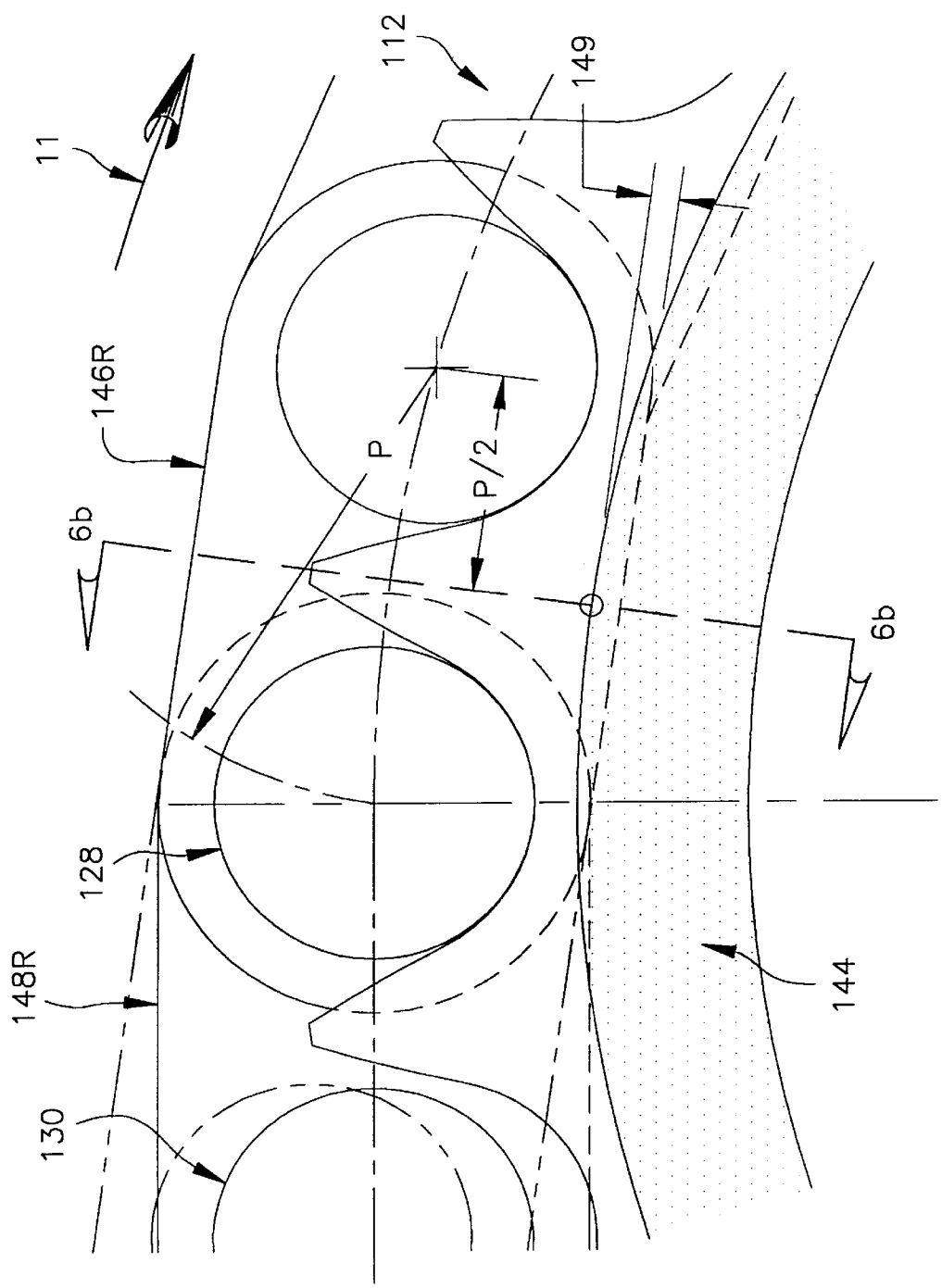
FIG. 6a is an enlarged partial view of the drive sprocket of FIG. 6 showing the interaction between a roller chain link plate and the cushion ring.

As a result of the above stated geometrical advantages, it is expected that the amount of rubber compression 249 can be beneficially less than the amount of rubber compression 149 (FIG. 6a) occurring with the prior art system. It is believed, therefore, that the inclined compression pads 402, acting with the transverse grooves 404, and the asymmetrical tooth spaces 254, 258, will enhance the fatigue life of the rubber cushion rings 244 over that of the convention cushion rings 144 (FIG. 6). It is believed that the increased damping of the present invention during the meshing process will result is greater noise reduction for the chain drive.

Further, the sprocket of the present invention can achieve substantially equivalent damping with reduced compression, compared to a sprocket incorporating a conventional round cushion ring 144 (FIG. 6). This is a result of the increased mechanical advantage inherent in the undulated or uneven surface 400 of the cushion ring 244 of the present invention. Thus, the radial compression can be balanced to have enhanced durability with substantially similar noise attenuation. In other words, the undulated or uneven surface 400 requires less compression for equivalent damping. Alternatively, greater noise attenuation can be achieved with the equivalent maximum compression during the meshing process.

In sum, the above-described random engagement roller chain drive sprocket 212 includes two groups of sprocket teeth, each having a different tooth profile, that are arranged in a random or arbitrary pattern in order to modify the meshing impact frequency by altering the point and rhythm of the initial roller-to-sprocket contacts from one tooth profile to the next. It should be appreciated that the different sets of sprocket teeth profiles can be arranged in many different random or arbitrary patterns.

Further, it is also contemplated that the different sets of sprocket teeth can be arranged in many regular patterns that would work equally as well. In all cases, the arrangement of two sets of different sprocket teeth on a sprocket provides a means for breaking up the mesh frequency impact noise normally associated with and induced by a full complement of substantially identically shaped sprocket teeth. Mesh frequency noise reduction and broadband noise reduction are achieved by altering the point and rhythm of initial roller-to-sprocket contacts from one tooth profile to the next, and by buffering or softening the engaging impact of the roller as they leave the span and collide with the sprocket during the meshing process.

The above-described random engagement roller chain drive sprocket 212 has two groups of sprocket teeth, each having a different tooth profile that incorporates root relief. However, it is contemplated that only one of the two sets of sprocket teeth incorporate root relief. It is also contemplated that only certain ones of the first and/or second plurality of sprocket teeth incorporate root relief.

The crankshaft sprocket, generally the smallest sprocket in the chain drive, is usually the major noise contributor. The typically larger driven camshaft sprocket, however, will also contribute to the generated noise levels, but generally to a lesser extent than the crankshaft sprocket. However, the driven sprocket, particularly if it is nearly the same size or smaller than the driving sprocket, may be the prime noise generator, as in the case with balance shaft sprockets and pump sprockets. Thus, the features of the present invention may also be used advantageously with camshaft or driven sprockets as well.

It should be appreciated that the disclosed asymmetrical tooth profile features can be altered slightly without substantially deviating from the chain and sprocket meshing kinematics that produce the noise reduction advantages of the present invention. For example, the engaging asymmetrical flank profiles can be approximated by an involute form, and the disengaging asymmetrical flank profiles can be approximated by a different involute form. Slight changes to the profile may be done for manufacturing and/or quality control reasons—or simply to improve part dimensioning.

Figure 1:
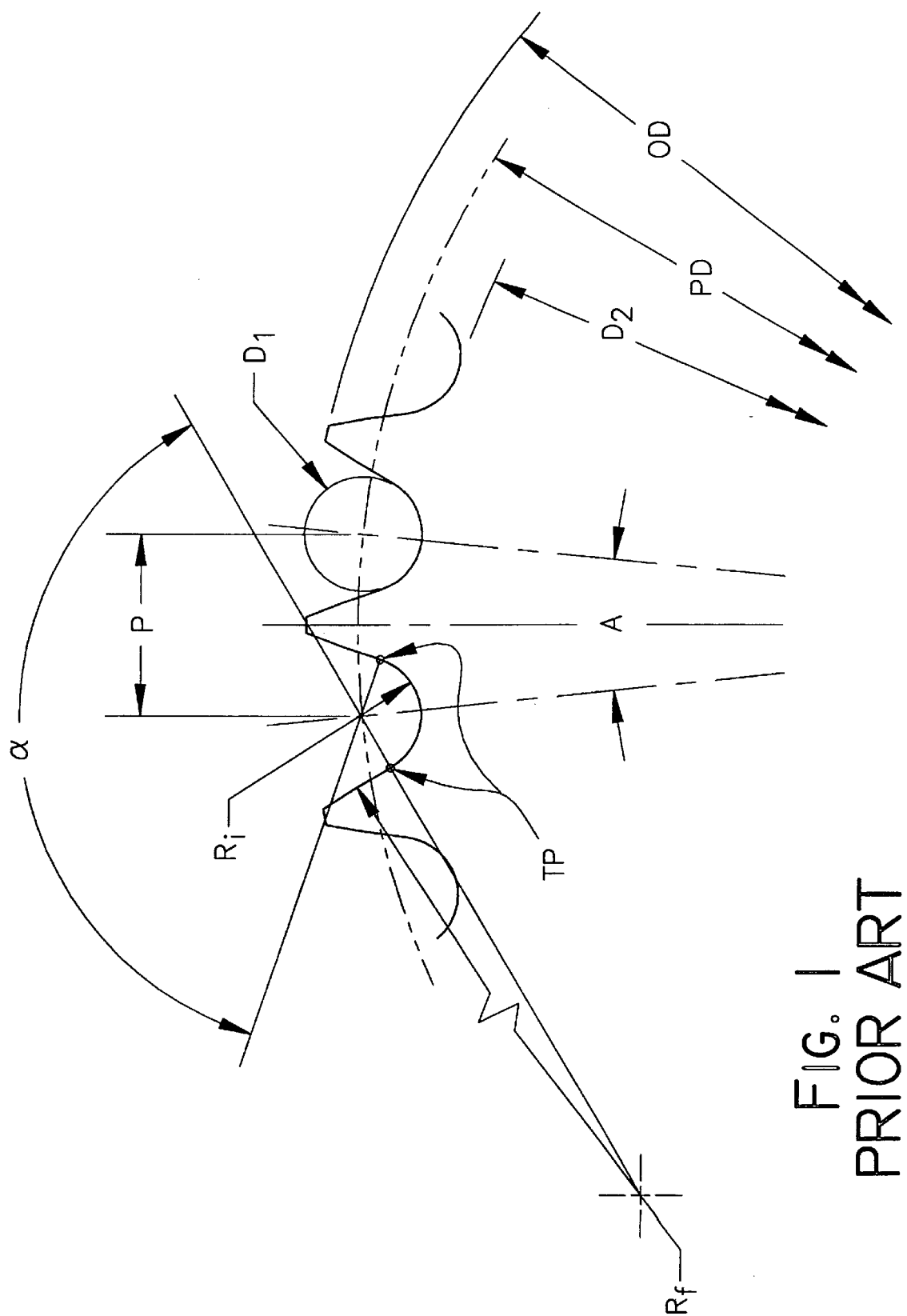
FIG. 1 illustrates a symmetrical tooth space form for an ISO-606 compliant roller chain sprocket.
Figure 2:
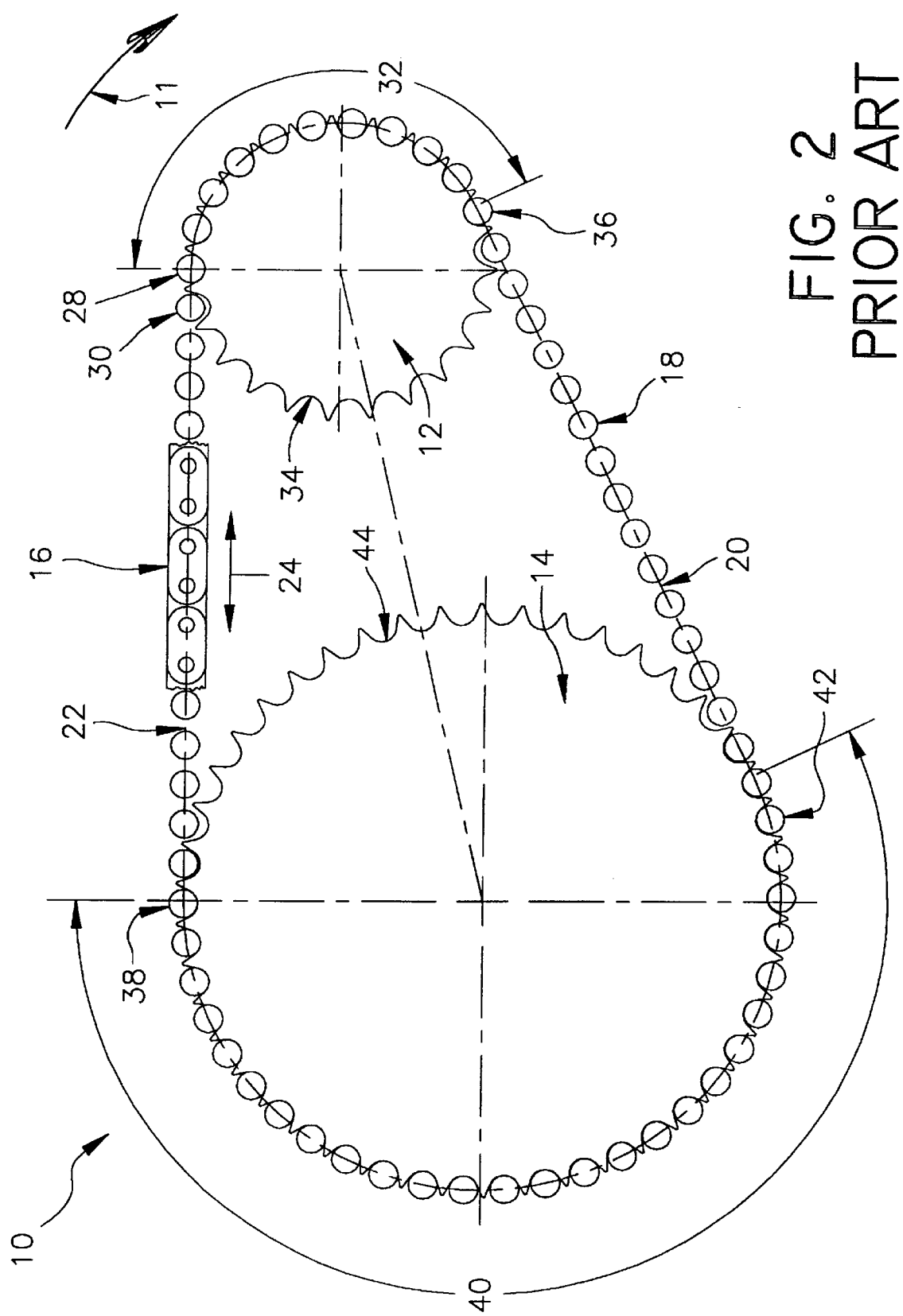
FIG. 2 is an exemplary roller chain drive system having an ISO-606 compliant drive sprocket, driven sprocket, and roller chain.
Figure 6B:
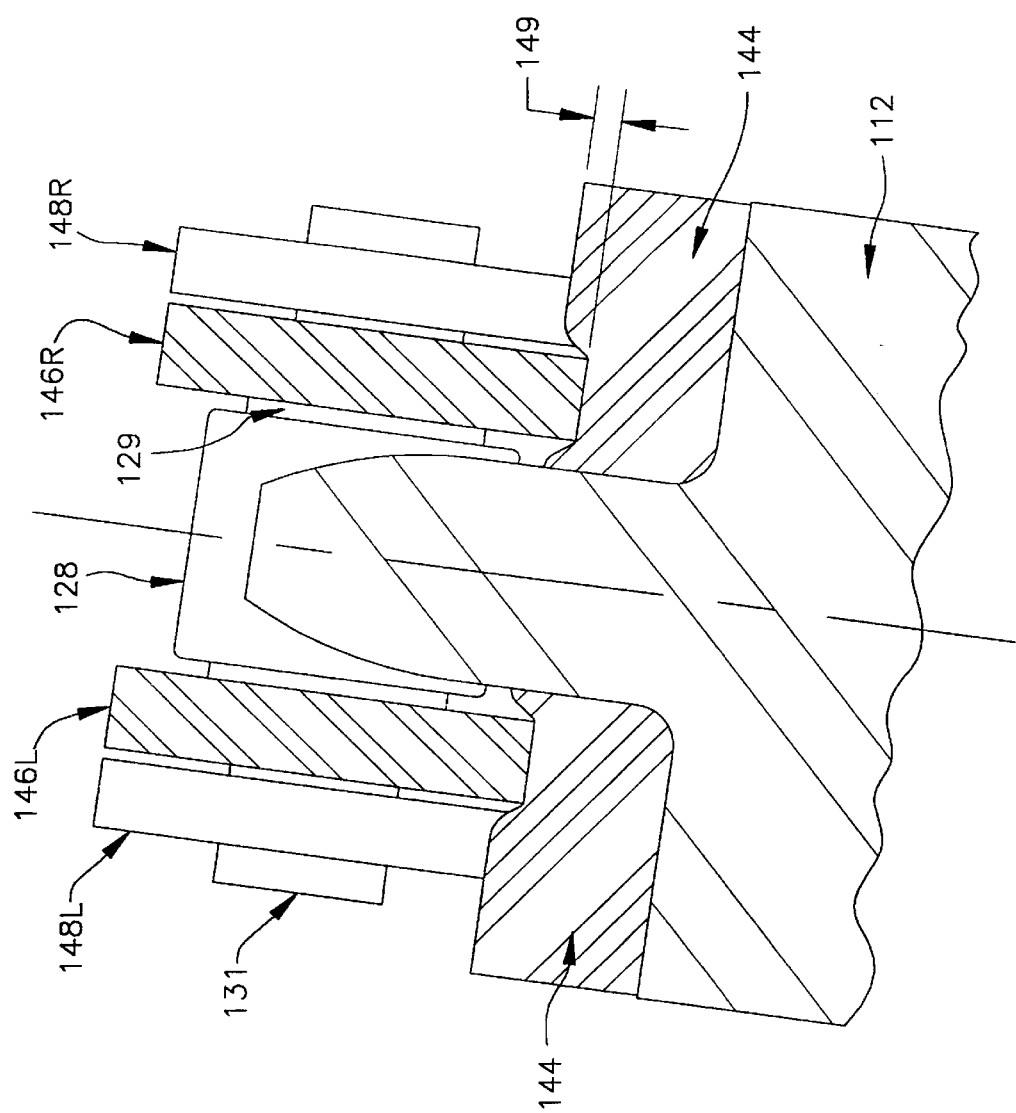
Figure 13:
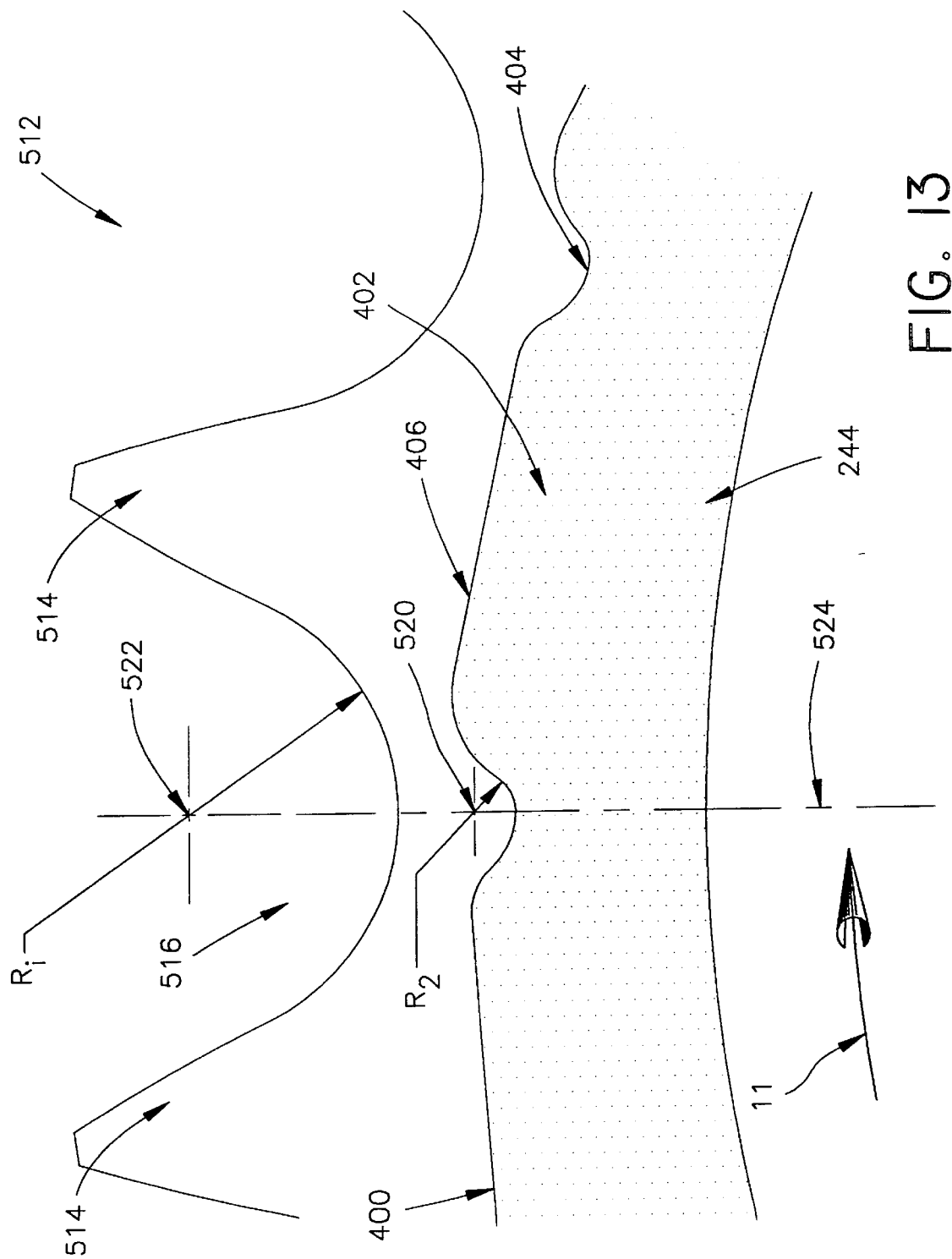
FIG. 13 is an enlarged partial view of an ISO-606 compliant sprocket illustrating the relationship between the ISO-606 compliant sprocket tooth spaces and the cushion ring pads and grooves of the present invention.

It is also contemplated that one or more of the cushion rings 244 of the present invention can be mounted to a known ISO-606 compliant sprocket, such as the sprocket 12 (FIG. 2), in order to achieve NVH gains over an ISO-606 compliant sprocket incorporating a known cushion ring, such as the cushion ring 144 (FIGS. 6–6*b*). Referring now to FIG. 13, an ISO-606 compliant sprocket 512 includes a plurality of symmetrical sprocket teeth 514. Adjacent sprocket teeth cooperate to define a symmetrical tooth space 516 having a root surface 518. At least one elastomeric cushion ring 244 is mounted to the sprocket 512.

As mentioned above, each groove 404 is defined by at least one radius $R_2$ extending from an arc center 520 of the groove 404 (in the embodiment being described, the grooves 404 are defined by at least two radii). Likewise, the root surface 518 is defined by a radius $R_i$ that extends from an arc center 522 of the root surface defined by the radius $R_i$.

A radial line 524 can be drawn between the arc center 522 of the root surface portion defined by the radius $R_i$ and the center of the sprocket 512. The cushion ring 244, and more particularly, the compression pads 402 and grooves 404, are oriented relative to the sprocket such that the arc centers 520 of the groove portions defined by the radii $R_2$ are positioned at least proximate the radial lines 524. Preferably, the arc centers 520 of the groove portions defined by the radii $R_2$ are positioned on the radial lines 524.

The invention has been described with reference to the preferred embodiment. obviously, modifications will occur to others upon a reading and understanding of this specification and this invention is intended to include same insofar as they come within the scope of the appended claims or the equivalents thereof.

For instance, it should be appreciated that the tooth space embodiments of the present invention can be classified as being asymmetrical when i) the engaging side roller seating angle β is greater than the disengaging side roller seating angle β', and ii) the engaging side roller seating angle β is equal to disengaging side roller seating angle β' and the engaging side profile is different than the adjacent disengaging side profile, such as when the engaging side includes a flank flat 270 etc. Further, the engaging asymmetrical flank profile could be approximated by an involute form, and the disengaging asymmetrical flank profile could be approximated by a different involute form.

Having thus described the preferred embodiments, the invention is now claimed to be:

1. A sprocket comprising:
    a central body portion having a plurality of sprocket teeth spaced along a circumference of the central body portion, the plurality of sprocket teeth each having an engaging flank and a disengaging flank;
    an engaging flank of a first tooth of the plurality of sprocket teeth cooperating with a disengaging flank of a second tooth of the plurality of sprocket teeth to define a tooth space having a root surface extending between the engaging flank of the first tooth and the disengaging flank of the second tooth, the root surface having a first root surface portion defined by a first radius extending from an arc center of the first root surface portion;
    a cushion ring mounted to a first face of the central body section and having a plurality of compression pads and a plurality of grooves alternately positioned around a circumference of the cushion ring;
    a first groove of the plurality of grooves having a first groove portion defined by a second radius extending from an arc center of the first groove portion, the arc center of the first groove portion being positioned at least proximate a radial line extending between a center of the central body portion and the arc center of the first root surface portion; and
    a first compression pad having an inclined outer surface defined by a leading edge that is spaced radially inward relative to a trailing edge, the leading edge being positioned radially inward from the engaging flank of the first tooth, and the trailing edge being positioned radially inward from a disengaging flank of the first tooth.

2. The sprocket of claim 1, wherein the tooth space is an asymmetrical tooth space.

3. The sprocket of claim 1, wherein the tooth space is a symmetrical tooth space.

4. The sprocket of claim 1, wherein the first root surface portion is spaced apart from an associated roller to provide a clearance between the first root surface portion and an associated roller during rotation of the sprocket.

5. The sprocket of claim 1, wherein the tooth space is defined by an engaging side roller seating angle (β) that is greater than a disengaging side roller seating angle (β').

6. The sprocket of claim 1, wherein the tooth space complies with an international manufacturing standard from the group consisting of ISO, JIS, and DIN.

7. The sprocket of claim 1, wherein the tooth space further includes:
    a first flat surface tangent to and extending radially inward of the engaging flank, a second root surface portion tangent to and extending radially inward of the first flat surface, and a second flat surface tangent to and extending radially inward of the second root surface portion, the first root surface portion being tangent to and extending radially inward of the second flat surface; and
    a third radius defining the second root surface portion being less than an associated roller radius so that a clearance exists between the second root surface portion and an associated roller when an associated roller is seated in driving contact within the tooth space.

8. The sprocket of claim 7, wherein the first flat surface includes:
    a first portion that promotes a staged impact between an associated roller and the sprocket, the staged impact including an initial tangential impact along the first flat surface followed by a subsequent radial impact, and
    a second portion that promotes an associated roller seating in two-point driving contact within the tooth space.

9. The sprocket of claim 8, wherein the second flat surface includes:
    a first portion that cooperates with the second portion of the first flat surface to promote an associated roller seating in two-point driving contact within the tooth space, and
    a second portion that facilitates spacing the first root surface portion from an associated roller to provide a second clearance between the first root surface portion and an associated roller when an associated roller is seated within the tooth space.

10. The sprocket of claim 9, wherein the tooth space further includes:
a third flat surface tangent to and extending radially outward of the first root surface portion and tangent to the disengaging flank, the third flat surface cooperating with the second flat surface to provide the second clearance between the first root surface portion and an associated roller when an associated roller is seated within the tooth space.

11. The sprocket of claim 1, wherein an engaging flank of a third tooth of the plurality of sprocket teeth cooperates with a disengaging flank of a fourth tooth of the plurality of sprocket teeth to define a second tooth space having a second root surface extending between the engaging flank of the third tooth and the disengaging flank of the fourth tooth, the second tooth space having a profile different from that of the first-mentioned tooth space.

12. The sprocket of claim 11, further including a plurality of first-mentioned tooth spaces and a plurality of second tooth spaces arbitrarily positioned along the circumference of the central body portion.

13. The sprocket of claim 11, wherein:
the first root surface portion of the first-mentioned tooth space is spaced apart from an associated roller to provide a first clearance between the first root surface portion and an associated roller during rotation of the sprocket; and
a second root surface portion of the second root surface is spaced apart from an associated roller to provide a second clearance between the second root surface portion and an associated roller during rotation of the sprocket.

14. The sprocket of claim 11, wherein the first-mentioned tooth space includes a flat surface tangent to and extending radially inward of the first tooth engaging flank, the flat surface promoting a staged impact between an associated roller and the sprocket, the staged impact including an initial tangential impact between an associated roller and the sprocket along the flat surface and a subsequent radial impact occurring after the initial tangential impact.

15. The sprocket of claim 11, wherein:
the first-mentioned tooth space is defined by a first engaging side roller seating angle (β); and
the second tooth space is defined by a second engaging side roller seating angle (β) that is different from the first roller seating angle (β).

16. The sprocket of claim 11, wherein a first associated roller initially impacts the sprocket at a first point along an engaging side of the first tooth, and a second associated roller chain initially impacts the sprocket at a second point along an engaging side of the third tooth spaced from the first point.

17. The sprocket of claim 1, further including a second cushion ring mounted to a second face of the central body section and having a plurality of compression pads and a plurality of grooves alternately positioned around a circumference of the cushion ring.

18. A unidirectional roller chain drive system including a plurality of sprockets and a roller chain having rollers in engaging contact with the sprockets, wherein at least one of the plurality of sprockets comprises:
a central body portion having a plurality of sprocket teeth spaced along a circumference of the central body portion, the plurality of sprocket teeth each having an engaging flank and a disengaging flank;
an engaging flank of a first tooth of the plurality of sprocket teeth cooperating with a disengaging flank of a second tooth of the plurality of sprocket teeth to define a tooth space having a root surface extending between the engaging flank of the first tooth and the disengaging flank of the second tooth, the root surface having a first root surface portion defined by a first radius extending from an arc center of the first root surface portion;
a cushion ring mounted to a first face of the central body section and having a plurality of compression pads and a plurality of grooves alternately positioned around a circumference of the cushion ring;
a first groove of the plurality of grooves having a first groove portion defined by a second radius extending from an arc center of the first groove portion, the arc center of the first groove portion being positioned at least proximate a radial line extending between a center of the central body portion and the arc center of the first root surface portion; and
a first compression pad having an inclined outer surface defined by a leading edge that is spaced radially inward relative to a trailing edge, the leading edge being positioned radially inward from the engaging flank of the first tooth, and the trailing edge being positioned radially inward from a disengaging flank of the first tooth.

19. The chain drive system of claim 18, wherein an engaging flank of a third tooth of the plurality of sprocket teeth cooperates with a disengaging flank of a fourth tooth of the plurality of sprocket teeth to define a second tooth space having a second root surface extending between the engaging flank of the third tooth and the disengaging flank of the fourth tooth, the second tooth space having a profile different from that of the first-mentioned tooth space.

20. The chain drive system of claim 18, wherein:
the tooth space includes a flat surface tangent to and extending radially inward of the first tooth engaging flank, the flat surface promoting a staged impact between an associated roller and the sprocket, the staged impact including an initial tangential impact between an associated roller and the sprocket along the flat surface and a subsequent radial impact occurring after the initial tangential impact;
the first root surface portion being spaced apart from an associated roller to provide a first clearance between the first root surface portion and an associated roller during rotation of the sprocket; and
a second root surface portion of the second root surface being spaced apart from an associated roller to provide a second clearance between the second root surface portion and an associated roller during rotation of the sprocket.

* * * * *